(12) United States Patent
Singh

(10) Patent No.: US 11,496,612 B1
(45) Date of Patent: Nov. 8, 2022

(54) SCRAMBLED PACKET PAYLOAD MAPPING FOR ROBUST TRANSMISSION OF DATA

(71) Applicant: Mixhalo Corp., San Francisco, CA (US)

(72) Inventor: Vikram Singh, San Francisco, CA (US)

(73) Assignee: MIXHalo Corp., San Francisco, CA (US)

( * ) Notice: Subject to any disclaimer, the term of this patent is extended or adjusted under 35 U.S.C. 154(b) by 0 days.

(21) Appl. No.: 17/587,655

(22) Filed: Jan. 28, 2022

Related U.S. Application Data

(60) Provisional application No. 63/175,352, filed on Apr. 15, 2021.

(51) Int. Cl.
*H04L 69/166* (2022.01)
*H04L 43/0829* (2022.01)

(52) U.S. Cl.
CPC ........ *H04L 69/166* (2013.01); *H04L 43/0829* (2013.01)

(58) Field of Classification Search
CPC .......................... H04L 69/166; H04L 43/0829
See application file for complete search history.

(56) References Cited

U.S. PATENT DOCUMENTS

| | | | | |
|---|---|---|---|---|
| 7,359,343 B2 * | 4/2008 | Goodings | ................. | H04L 1/04 714/751 |
| 8,009,662 B2 * | 8/2011 | Lee | ...................... | H04N 21/235 375/240.27 |
| 2006/0050742 A1 * | 3/2006 | Grandhi | ............ | H04W 72/0446 370/506 |
| 2021/0091894 A1 | 3/2021 | Singh et al. | | |
| 2021/0092077 A1 * | 3/2021 | Singh | .................. | H04L 49/9005 |

OTHER PUBLICATIONS

Wikipedia contributors, "Error correction code," Wikipedia, The Free Encyclopedia, https://en.wikipedia.org/w/index.php?title=Error_correction_code&oldid=1068150739 (accessed Jan. 27, 2021).
Jun Takahashi et al. : "QoS enhancement 1-20 methods for MPEG video transmission on the internet", Computers and Communications , 2002 .Proceedings . ISCC 2002 . Seventh International Symposium on Jul. 1-4, 2002, Piscataway, NJ, USA, IEEE, Jul. 1, 2002 (Jul. 1, 2002) I pp. 106-113.

(Continued)

*Primary Examiner* — Mohamed A. Wasel
(74) *Attorney, Agent, or Firm* — Cesari and McKenna, LLP

(57) ABSTRACT

Systems and methods for transmitting data partitioned into a sequence of frames may include transmitting a first packet that includes a primary frame and one or more preceding frames from the sequence of frames of data, wherein the one or more preceding frames of the first packet are separated from the primary frame of the first packet in the sequence of frames by respective multiples of a stride parameter; transmitting a second packet that includes a primary frame and one or more preceding frames from the sequence of frames of data, wherein the primary frame of the first packet is one of the one or more preceding frames of the second packet; and, prior to transmitting the first packet and the second packet, randomly determining an order of transmission for the first packet and the second packet.

20 Claims, 15 Drawing Sheets

(56) References Cited

OTHER PUBLICATIONS

Xiao Liu et al: "A novel erro:i; control scheme for video streaming over IEEE802.11 network", Proceedings / CCECE 2003, Canadian Conference on Electrical and Computer Engineering : Toward a Daring and Humane Technology ; May 4-7, 2003, Montreal, Canada, IEEE, New York, NY, US, vol. 2, May 4, 2003 (May 4, 2003), pp. 981-984.

* cited by examiner

US 11,496,612 B1

SCRAMBLED PACKET PAYLOAD MAPPING FOR ROBUST TRANSMISSION OF DATA

CROSS-REFERENCE TO RELATED APPLICATION

This application claims priority to and the benefit of U.S. Provisional Application Patent Ser. No. 63/175,352 filed Apr. 15, 2021, the entire disclosure of which is hereby incorporated by reference.

TECHNICAL FIELD

This disclosure relates to scrambled packet payload mapping for robust transmission of data.

BACKGROUND

When working with data transmission over network applications there are two main types of Internet Protocol (IP) traffic, Transmission Control Protocol (TCP) and User Datagram Protocol (UDP). Each protocol has its own intended use and strengths.

For example, TCP is what's commonly known as an acknowledged mode protocol. This means that when data is being exchanged, a built-in feedback mechanism checks and acknowledges whether the data was received correctly. If any data is missing or lost, further mechanisms retransmit the corrupt or missing information. These mechanisms make TCP particularly well suited for transferring information such as still images, data files and web pages. While this reliability makes TCP well suited for those use cases, it does come at a cost. In order to guarantee stability, each client receives their own TCP stream (known as unicasting) which means if there are many clients on the network, data is often replicated. These control and feedback mechanisms result in a larger protocol overhead, which means that a larger percentage of the valuable bandwidth on a network connection is being used for sending this additional control information. Aside from additional bandwidth overhead, the retransmission of data can cause an increase in latency, making real-time applications suffer.

UDP, on the other hand, is an unacknowledged mode protocol, meaning that there is no active mechanism to retransmit data that has been lost during the exchange. As such, in certain scenarios UDP would be a bad way to send and receive data compared to TCP—for example, sending an email or downloading a file. However, other factors make UDP superior for real-time communications. With UDP being unacknowledged, there are fewer protocol overheads to take up valuable space that could be used for useful data, making transmission quicker and more efficient.

SUMMARY

Disclosed herein are implementations of scrambled packet payload mapping for robust transmission of data.

In first aspect, a system is provided for transmitting data partitioned into a sequence of frames of data. The system includes a memory, a processor, and a network interface. The memory stores instructions executable by the processor to cause the system to: transmit, using the network interface, a first packet that includes a primary frame and two or more preceding frames from the sequence of frames of data, wherein at least one of the two or more preceding frames of the first packet is separated from the primary frame of the first packet in the sequence of frames by a respective multiple of a first stride parameter and at least one of the two or more preceding frames of the first packet is separated from the primary frame of the first packet in the sequence of frames by a respective multiple of a second stride parameter that is different from the first stride parameter; transmit, using the network interface, a second packet that includes a primary frame and two or more preceding frames from the sequence of frames of data, wherein at least one of the two or more preceding frames of the second packet is separated from the primary frame of the second packet in the sequence of frames by a respective multiple of the first stride parameter and at least one of the two or more preceding frames of the second packet is separated from the primary frame of the second packet in the sequence of frames by a respective multiple of the second stride parameter, and wherein the primary frame of the first packet is one of the two or more preceding frames of the second packet; and, prior to transmitting the first packet and the second packet, randomly determine an order of transmission for the first packet and the second packet.

In a second aspect, a method is provided for transmitting data partitioned into a sequence of frames of data. The method includes: transmitting, using a network interface, a first packet that includes a primary frame and two or more preceding frames from the sequence of frames of data, wherein at least one of the two or more preceding frames of the first packet is separated from the primary frame of the first packet in the sequence of frames by a respective multiple of a first stride parameter and at least one of the two or more preceding frames of the first packet is separated from the primary frame of the first packet in the sequence of frames by a respective multiple of a second stride parameter that is different from the first stride parameter; transmitting, using the network interface, a second packet that includes a primary frame and two or more preceding frames from the sequence of frames of data, wherein at least one of the two or more preceding frames of the second packet is separated from the primary frame of the second packet in the sequence of frames by a respective multiple of the first stride parameter and at least one of the two or more preceding frames of the second packet is separated from the primary frame of the second packet in the sequence of frames by a respective multiple of the second stride parameter, and wherein the primary frame of the first packet is one of the two or more preceding frames of the second packet; and, prior to transmitting the first packet and the second packet, randomly determining an order of transmission for the first packet and the second packet.

In a third aspect, a non-transitory computer-readable storage medium is provided for transmitting data partitioned into a sequence of frames of data. The non-transitory computer-readable storage medium includes executable instructions that, when executed by a processor, facilitate performance of operations, including: transmitting, using a network interface, a first packet that includes a primary frame and two or more preceding frames from the sequence of frames of data, wherein at least one of the two or more preceding frames of the first packet is separated from the primary frame of the first packet in the sequence of frames by a respective multiple of a first stride parameter and at least one of the two or more preceding frames of the first packet is separated from the primary frame of the first packet in the sequence of frames by a respective multiple of a second stride parameter that is different from the first stride parameter; transmitting, using the network interface, a second packet that includes a primary frame and two or more preceding frames from the sequence of frames of data, wherein at least one of the two or more preceding frames of the second packet is separated from the primary frame of the second packet in the sequence of frames by a respective multiple of the first stride parameter and at least one of the two or more preceding frames of the second packet is separated from the primary frame of the second packet in the sequence of frames by a respective multiple of the second stride parameter, and wherein the primary frame of the first packet is one of the two or more preceding frames of the second packet; and, prior to transmitting the first packet and the second packet, randomly determining an order of transmission for the first packet and the second packet.

In fourth aspect, a system is provided for transmitting data partitioned into a sequence of frames of data. The system includes a memory, a processor, and a network interface. The memory stores instructions executable by the processor to cause the system to: transmit, using the network interface, a first packet that includes a primary frame and one or more preceding frames from the sequence of frames of data, wherein the one or more preceding frames of the first packet are separated from the primary frame of the first packet in the sequence of frames by respective multiples of a stride parameter; transmit, using the network interface, a second packet that includes a primary frame and one or more preceding frames from the sequence of frames of data, wherein the one or more preceding frames of the second packet are separated from the primary frame of the second packet in the sequence of frames by respective multiples of the stride parameter, and wherein the primary frame of the first packet is one of the one or more preceding frames of the second packet; and, prior to transmitting the first packet and the second packet, randomly determine an order of transmission for the first packet and the second packet.

In a fifth aspect, a method is provided for transmitting data partitioned into a sequence of frames of data. The method includes: transmitting a first packet that includes a primary frame and one or more preceding frames from the sequence of frames of data, wherein the one or more preceding frames of the first packet are separated from the primary frame of the first packet in the sequence of frames by respective multiples of a stride parameter; transmitting a second packet that includes a primary frame and one or more preceding frames from the sequence of frames of data, wherein the one or more preceding frames of the second packet are separated from the primary frame of the second packet in the sequence of frames by respective multiples of the stride parameter, and wherein the primary frame of the first packet is one of the one or more preceding frames of the second packet; and, prior to transmitting the first packet and the second packet, randomly determining an order of transmission for the first packet and the second packet.

In a sixth aspect, a non-transitory computer-readable storage medium is provided for transmitting data partitioned into a sequence of frames of data. The non-transitory computer-readable storage medium includes executable instructions that, when executed by a processor, facilitate performance of operations, including: transmitting a first packet that includes a primary frame and one or more preceding frames from the sequence of frames of data, wherein the one or more preceding frames of the first packet are separated from the primary frame of the first packet in the sequence of frames by respective multiples of a stride parameter; transmitting a second packet that includes a primary frame and one or more preceding frames from the sequence of frames of data, wherein the one or more preceding frames of the second packet are separated from the primary frame of the second packet in the sequence of frames by respective multiples of the stride parameter, and wherein the primary frame of the first packet is one of the one or more preceding frames of the second packet; and, prior to transmitting the first packet and the second packet, randomly determining an order of transmission for the first packet and the second packet.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
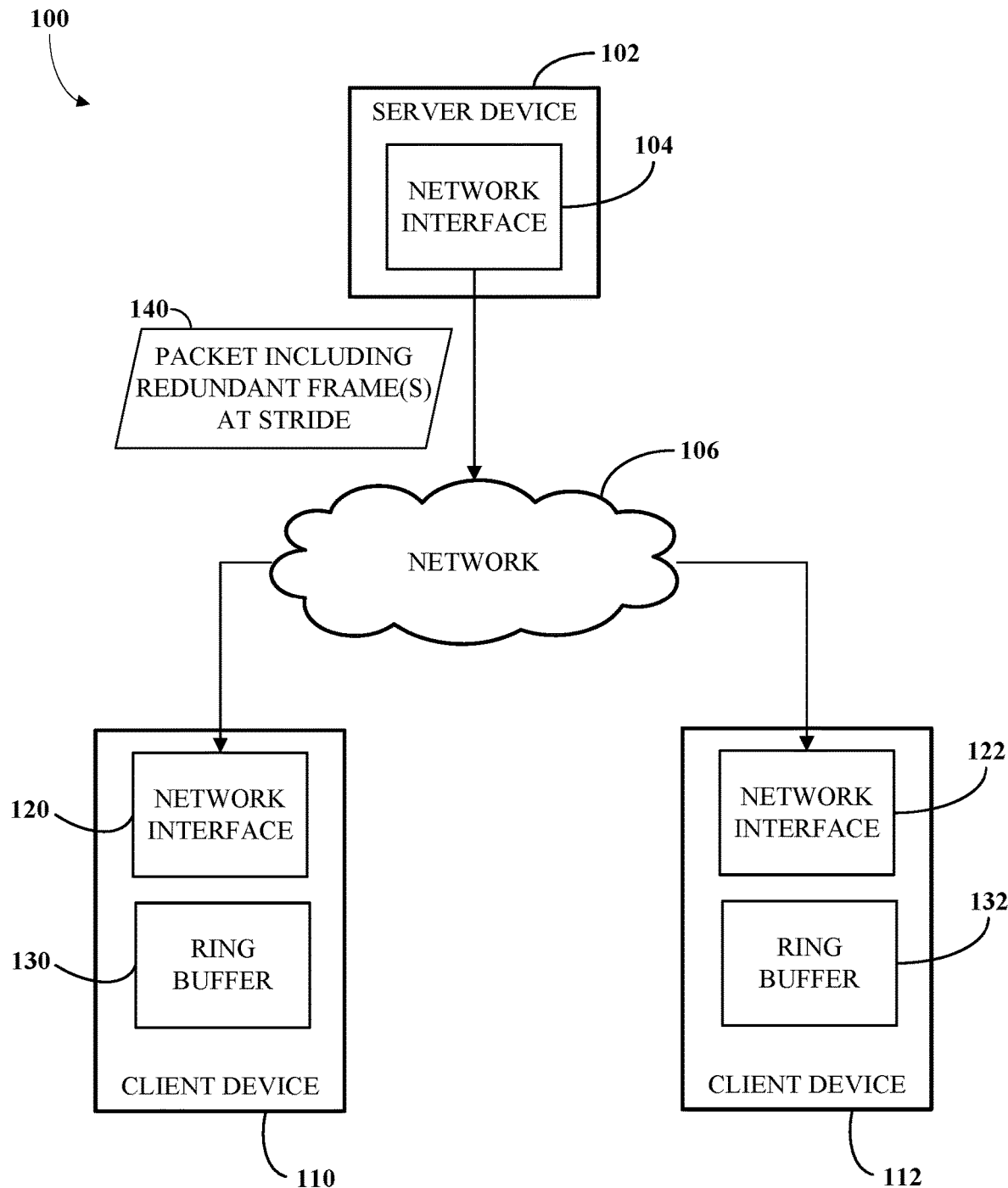
FIG. 1 is a block diagram of an example of a system for transferring framed data from a server to one or more client devices using packet payload mapping for robust transmission of data.

When viewed through the lens of real-time data transmission, UDP becomes the preferred transport layer protocol due to the lack of overhead and or low latency constraints. However, the lack of retransmission poses the problem of stability and reliability. In general, it is accepted that some loss will occur when using UDP (hence the crackles that appear in audio or the glitches that appear in video). The packet-frame mapping schemes described herein may provide methods to recover some of this lost data.

Packet-frame mapping provides a way to distribute redundant data to allow for recovery data loss when using UDP. Other methods exist to achieve this type of recovery (such as Forward Error Correction), but packet-frame mapping may use different ways of distributing and ordering its redundant data that may provide advantages over prior systems. For example, systems implementing packet-frame mapping for transmission of framed data may be more robust to long bursts of packet loss, which may be common in some network environments, such as congested high-traffic wireless networks.

There are a couple terms to define when describing a packet-frame mapping scheme. As used herein, "stride" is a spacing in terms of number of frames in a sequence of frames of data between frames that are selected for inclusion in a given packet. For example, the stride of a packet-frame mapping scheme may correspond to the minimum number of sequential packets that a client device is confident in receiving after losing a maps worth of data (e.g., the longest packet loss burst the scheme is designed to fully recover from. This number may be chosen based on received packet statistics.

As used herein, "segment" is a redundancy parameter indicating the number of redundant frames being bundle into a packet.

As used herein, the "length" of a packet-frame map is the lowest frame index or largest absolute index, relative to the current frame with an index of zero, in the map. For example, in an audio stream, the length multiplied by the frame size, is how much audio can be recovered. For example, for a packet-frame map with a length of 64 and a frame size of 2.5 ms, 160 ms of audio can be recovered using this map.

As used herein, a packet map data structure indicates the stride and the segment of the packet mapping scheme and may specify the structure of the packet payloads encoded on the network or other communication channel. For example, a server device may use the packet map data structure to create and send the data to decode packet payloads and instantiate buffers for receiving the packets to exploit the redundancy. For example, $\{0, -16, -32, -48, -64\}$ is a map with a stride of 16 and a segment of 4. The packet frame mapping may be designed to recover data after high packet loss events. It can also deal with occasional packet loss; however, it shines in large loss events. For example, during a scanning event, an iOS device could lose 45 to 55 packets and then receive 16 packets, before losing 45 to 55 packets again. In this scenario, a stride of 16 and a segment of 4 would allow for the recovery of burst packet losses up to 64 packets long, and thus make the system robust to the iOS scanning events.

A packet frame mapping with this style of packet-frame map is particularly good at recovery for a stable, recurring loss pattern. For example, when a wireless scan happens on a mobile device, the wireless card leaves its primary channel and hops to other channels to do quick scans, searching to see if there is a more performant channel to switch to. As a result, a pattern may occur that looks like this: 50 packets lost, 20 packets received, 50 packets lost, 20 packets received, 50 packets lost, 20 packets received, and so on. For context, this is due to the wireless card hopping off the primary channel, scanning, and hopping back. Hence the loss, receive, loss pattern. The example packet-frame map allows full recovery in this scenario.

As powerful as a packet-frame map with a single stride is, there are limitations to this pattern-based recovery. For example, a stride of 16 indicates that the devices needs to receive 16 packets after a loss event to guarantee full recovery from the largest supported packet loss event. In noisy wireless environments, it may be common to lose packets every couple of received packets in a random, pattern free fashion. This type of environment paired with a wireless scan would cause a single-stride packet-frame mapping to fail unless it dramatically reduced its stride. For example, a single-stride map with a stride of 4 and a length of 64: $\{0, -4, -8, -12, -16, -20, -24, -28, -32, -36, -40, -44, -48, -52, -56, -60, -64\}$ has to use a large segment of 16, which increases the. As illustrated, this increases the number of frames in the packet and as a result increases network bandwidth consumption of the packet-frame map scheme.

To better handle occasional or sporadic packet loss, a packet-frame map may be expanded to support multiple strides. For example, a short stride (e.g., 1 or 2) may be paired with a longer stride (e.g., 8 or 16) to handle packet loss with different profiles. Each stride in a packet-frame map may have a respective segment that specifies the number of redundant frames per packet at that stride.

In some implementations, by varying the stride a multi-stride packet-frame map can be used, which can help address both packet loss scenarios nicely. For example, the packet-frame map $\{0, -1, -2, -3, -4, -8, -16, -32, -48, -64\}$ has a stride of 1 with segment of 4 and a stride of 8 with a segment of 5 and would be able handle small frequent packet loss events thanks to the small stride at the beginning of the map, while also being able to recover larger amounts of data thanks to the large length value. The total number of redundant frames per packet is the sum of the segments across all the strides in the packet-frame map, which in this example is 4+5=9 redundant frames per packet.

A system for implementing a packet-frame mapping scheme, may include a server to package and send the data according to a packet map data structure as well as a client which can unpack and utilize the redundant data correctly. In some implementations, a client device uses two separate types of buffers: a ring buffer and a reassembly buffer. The size of the ring buffer may be determined by the size of the stride and the segment. In our example, the stride is 16 and the segment is 4, so the ring buffer may be sized to store frames from (stride×segment)+1 packets=65 packets. In some implementations, the ring buffer may be sized to store frames from (stride×segment) packets=64 packets and a latest packet or live packet, that bears as its oldest frame a copy of a frame that is the newest frame of the oldest packet stored in the ring buffer, may be stored outside of the ring buffer until after the oldest packet has been deleted from the ring buffer. For example, if we have frames that are audio data corresponding to audio signal of duration 2.5 milliseconds and the buffers are sized to recover up to 64 frames (e.g., the lowest number in the packet map data structure) the latency introduced by the buffering scheme would be 2.5 milliseconds*64=160 milliseconds. For example, the size of the reassembly buffer may be dependent on the size of the stride, in this case 16. The purpose of the ring buffer is to receive and figure out which data has been lost. Then the data may be reconstructed in the reassembly buffer in order allowing for the lost data to be recovered and played correctly.

Some implementations may employ sender-side scrambling, i.e., randomizing a transmission order for packets bearing the framed data in accordance with a packet mapping scheme. Instead of only creating a buffer client side and having the client store and then reorder the frames, a buffer may be added on the server side and the order of transmission for the packets with redundancy may be randomly scrambled before transmitting them to the client. While the order of primary frames is scrambled, the redundant frames are still paired with their same respective primary frames in accordance with a packet mapping scheme. Sender-side scrambling of the transmission order may provide advantages, such as, increasing resilience to burst packet loss events, making the system more robust.

FIG. 1 is a block diagram of an example of a system 100 for transferring framed data from a server to one or more client devices using packet payload mapping for robust transmission of data. The system 100 includes a server device 102 with a network interface 104 configured to send and receive data via a network 106. The network 106 can include, for example, the Internet, and/or the network 106 can be, or include, a local area network (LAN), a wide area network (WAN), a virtual private network (VPN), or any other public or private means of electronic computer communication capable of transferring data between computing devices (e.g., a client and a server). The network 106 or any other element, or combination of elements, of the system 100 can include network hardware such as routers, switches, load balancers, other network devices, or combinations thereof. For example, the network 106 may be a WiFi network. For example, the network 106 may be a cellular telephony network. For example, the server device 102 may include an audio server that transmits audio data to client devices via the network 106. In some implementations, the server device 102 is configured to multicast audio data of a live concert or musical performance to personal computing devices (e.g., smartphones or tablets) of concert goers via wireless network (e.g., a WiFi network) in a stadium or other venue. For example, the server device 102 may include a video server that transmits video data to client devices via the network 106. For example, the server device 102 may include a file server that transmits files to client devices via the network 106. For example, the server device may include components of the computing device 400 of FIG. 4. For example, the server device 102 may implement the process 500 of FIG. 5. For example, the server device 102 may implement the process 1000 of FIG. 10.

The system 100 also includes a client device 110 and a client device 112. The client device 110 includes a network interface 120 configured to send and receive data via a network 106. The client device 112 includes a network interface 122 configured to send and receive data via a network 106. The client device 110 includes a ring buffer 130 that may be used facilitate the reception of framed data using packet payload mapping for robust transmission of data. The ring buffer 130 may allow for the use redundancy in a packet payload mapping to recover from loss of packets during transmission, including potentially long bursts of packet loss. For example, the ring buffer 130 may include entries that each hold the primary frame and the one or more preceding frames of a packet. In some implementations, the ring buffer 130 may store multiple copies of frames of data and be configured to output a single copy of each frame in a sequence of frames of data. For example, the ring buffer 130 may be provisioned based on one or more parameters of a packet payload mapping scheme, such as a stride parameter and/or a redundancy parameter. For example, the ring buffer 130 may be the ring buffer 302 of FIGS. 3A and 3B. Similarly, the client device 112 includes a ring buffer 132 that may be used facilitate the reception of framed data using packet payload mapping for robust transmission of data. For example, the ring buffer 132 may be the ring buffer 302 of FIGS. 3A and 3B. For example, the client device 110 may include components of the computing device 400 of FIG. 4. For example, the client device 112 may include components of the computing device 400 of FIG. 4. For example, the client device 110 and the client device 112 may implement the process 600 of FIG. 6. For example, the client device 110 and the client device 112 may implement the process 1100 of FIG. 11.

The server device 102 is configured to transmit packets, including a packet 140, that include one or more redundant frames of data spaced in a sequence of frames by a number of frames determined by a stride parameter for a packet payload mapping scheme. For example, in a packet payload mapping scheme where a stride parameter is five and a redundancy parameter is three, the packet 140 may include a primary frame with frame index I, a preceding frame with frame index 1-5, a preceding frame with frame index I-10, and a preceding frame with frame index 1-15. For example, the packet encoding scheme 200 of FIG. 2 may be used to encode the packet 140 and other packets transmitted by the server device 102. In some implementations, the packet 140 is multicast by the server device 102 to the client device 110 and the client device 112. In some implementations, the packet 140 is broadcast by the server device 102 to all devices on the network 106. In some implementations, the packet 140 is unicast by the server device 102 to client device 110. Note, two client devices 110 and 112 are shown in FIG. 1 for simplicity, but many more client devices could be supported by the server device 102.

Figure 2:
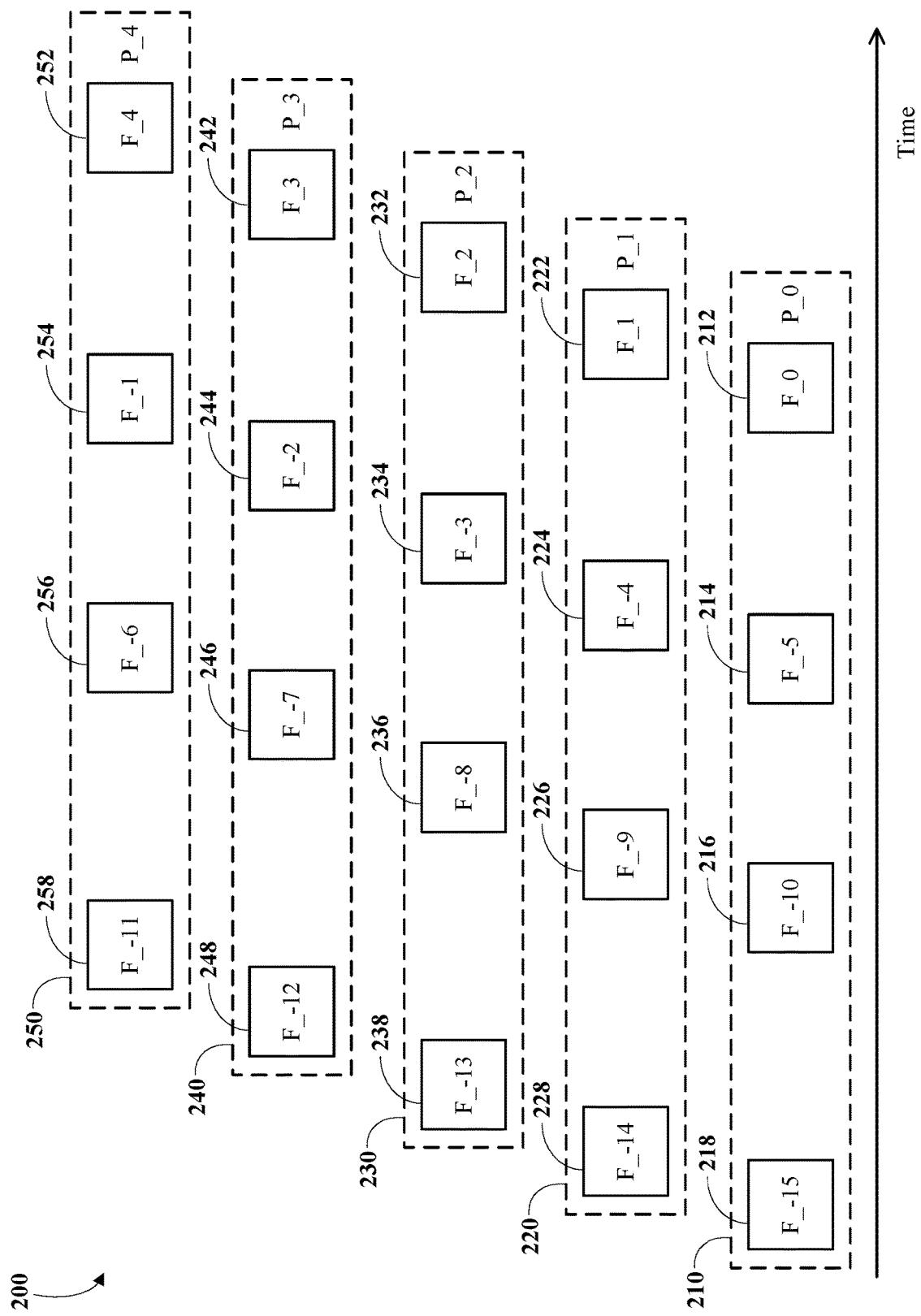
FIG. 2 is a timing diagram of an example of packet encoding scheme using packet payload mapping for robust transmission of data.

FIG. 2 is a timing diagram of an example of packet encoding scheme 200 using packet payload mapping for robust transmission of data. The packet encoding scheme 200 uses a stride parameter of five, which means the frames included in a packet are spaced in a sequence of frames of data by five frames from each other. The packet encoding scheme 200 uses redundancy parameter of three, which means the packets include a primary (e.g., most recent) frame and three preceding frames, which may have been transmitted in previous packets as a primary frame and/or as a preceding frame, spaced according to the stride parameter.

The first packet transmitted is packet zero 210, which includes a primary frame 212 with a frame index of 0, a preceding frame 214 with a frame index of −5 (i.e., five frames before frame 0), a preceding frame 216 with a frame index of −10, and a preceding frame 218 with a frame index of −15. The second packet transmitted is packet one 220, which includes a primary frame 222 with a frame index of 1, a preceding frame 224 with a frame index of −4, a preceding frame 226 with a frame index of −9, and a preceding frame 228 with a frame index of −14. The third packet transmitted is packet two 230, which includes a primary frame 232 with a frame index of 2, a preceding frame 234 with a frame index of −3, a preceding frame 236 with a frame index of −8, and a preceding frame 238 with a frame index of −13. The fourth packet transmitted is packet three 240, which includes a primary frame 242 with a frame index of 3, a preceding frame 244 with a frame index of −2, a preceding frame 246 with a frame index of −7, and a preceding frame 248 with a frame index of −12. The fifth packet transmitted is packet four 250, which includes a primary frame 252 with a frame index of 4, a preceding frame 254 with a frame index of −1, a preceding frame 256 with a frame index of −6, and a preceding frame 258 with a frame index of −11.

For example, the packet encoding scheme 200 enables to recovery of a burst of packet loss of up to 15 packets (i.e., stride times redundancy) based on the reception of five consecutive packets (i.e., stride consecutive packets). For example, the packet encoding scheme 200 may be well suited to network environments that are prone to long bursts of packet loss.

Figure 3A:
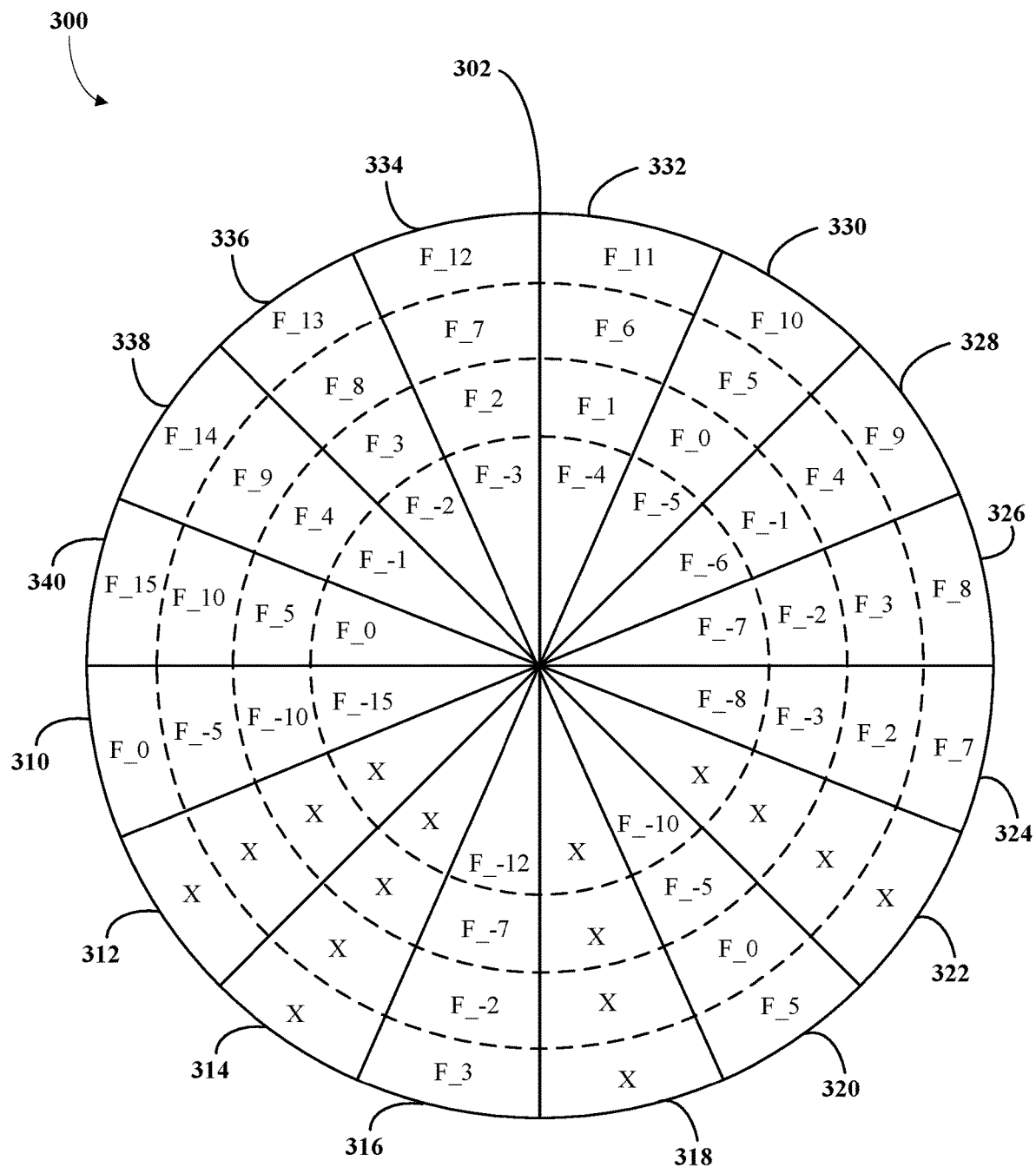
FIGS. 3A and 3B are memory maps of an example of a ring buffer with entries that each hold the primary frame and the one or more preceding frames of a packet.

FIG. 3A shows a memory map 300 of an example of a ring buffer 302 with entries 310-340 that each hold the primary frame and the one or more preceding frames of a packet. In this example, the ring buffer 302 is sized to support a packet payload mapping scheme (e.g., the packet encoding scheme 200 of FIG. 2) with a stride parameter of five and a redundancy parameter of three. The outer ring of the memory map 300 represents the primary frames stored for each packet. The three inner rings of the memory map 300 represents the preceding frames stored for each packet. In the memory map 300, the entry 310 of the ring buffer 302 corresponds to the oldest packet with frames currently stored in the ring buffer 302. The entry 340 of the ring buffer 302 corresponds to the newest packet with frames currently stored in the ring buffer 302. The entry 310 is next entry to be evaluated to read the next frame of data from the ring buffer 302. Since the entry 310 stores a valid copy of the frame with index 0 as its primary frame (i.e., the corresponding packet was successfully received), the frame with index 0 may be read as the primary frame from entry 310 of the ring buffer 302. Responsive to the primary frame of the entry 310 being read from the ring buffer 302, the entry 310 may be deleted (e.g., the memory locations may be released for reuse). Note that entry 340 includes a copy of the frame with index 0 in its oldest (innermost) preceding frame slot. By waiting until the packet corresponding to entry 340 is received to read the entry 310 with this frame as its primary frame, the chance of having a valid copy of the frame with index zero at the time of the read from the ring buffer 302 is maximized. Thus, the ring buffer 302 may be sized to store frames from a number (i.e., 16 in this example) of packets equal to the (stride×redundancy)+1. For real-time media transmissions (e.g., audio or video), this buffering scheme may introduce an algorithmic latency corresponding to the frame duration (e.g., 2.5 milliseconds or 5 milliseconds) times the stride parameter times the redundancy parameter.

For example, the ring buffer 302 may be implemented a circular buffer. In some implementations, the ring buffer 302 may take input from packets output from a jitter buffer and the ring buffer 302 may operate as a first-in-first-out (FIFO) buffer.

Figure 3B:
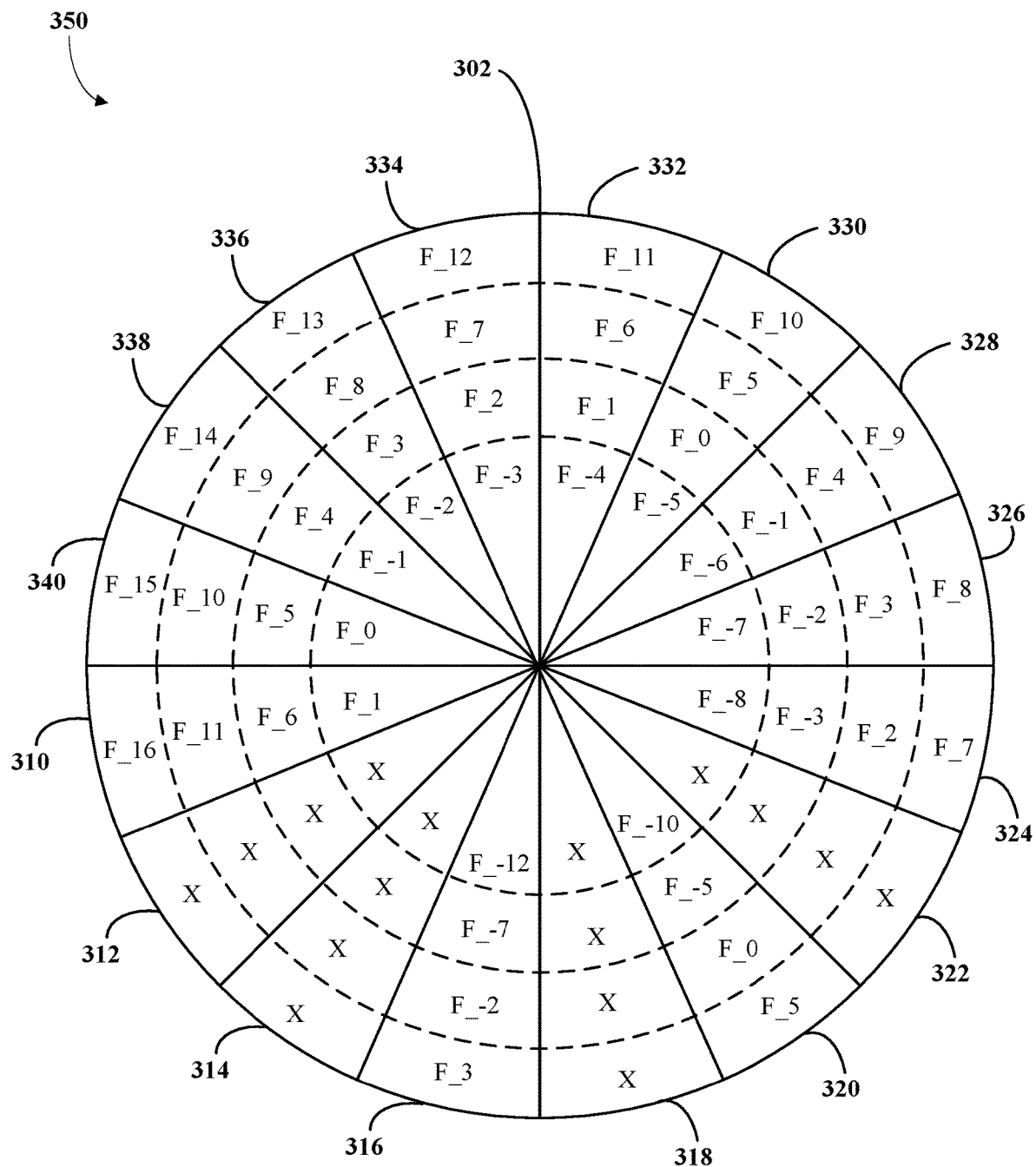

FIG. 3B shows a memory map 350 of the ring buffer 302 with entries that each hold the primary frame and the one or more preceding frames of a packet. The memory map 350 shows the ring buffer 302 at a time later than the state in the memory map 300 of FIG. 3A. The entry 310 has been updated to store to the frames of a newest packet that has been received. This newest packet includes a primary frame with frame index 16. Now, the entry 312 corresponds to the oldest packet that should have its frames stored in the ring buffer 302. However, the packet corresponding to the entry 312 has been lost (e.g., corrupted or otherwise lost). Therefore, the next frame on the sequence of frames with index 1 is not available as the primary frame in entry 312. Instead the ring buffer 302 may be searched for a valid copy of this next frame for read out. In this example, there are two valid copies of the frame with index 1 stored as preceding frames in the ring buffer in entry 332 and in entry 310. One of these copies of the frame with index 1 may then be read as a preceding frame from the ring buffer 302.

Figure 4:
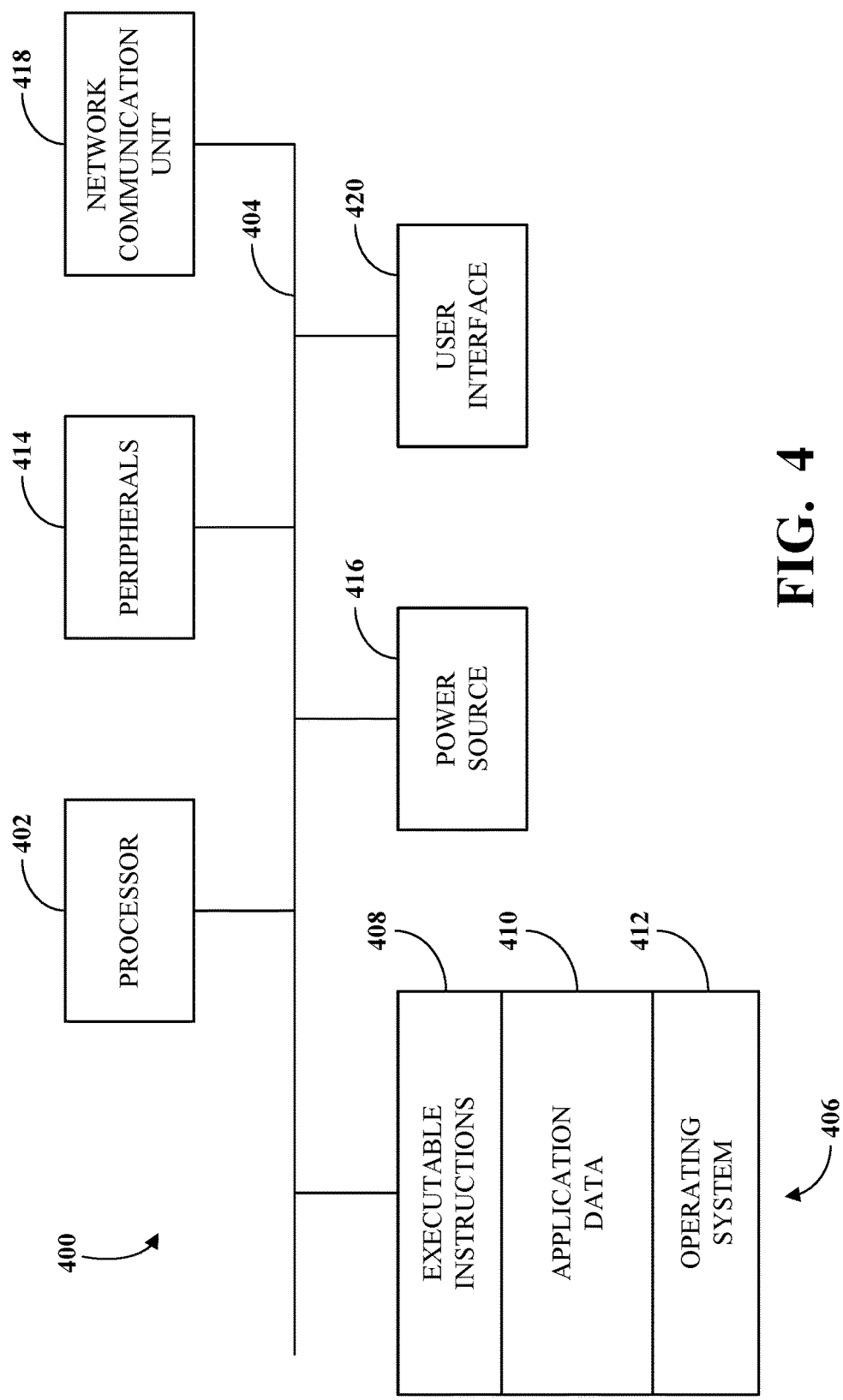
FIG. 4 is a block diagram of an example of an internal configuration of a computing device of the system shown in FIG. 1.

FIG. 4 is a block diagram of an example of an internal configuration of a computing device 400 of the system shown in FIG. 1, such as a server device 102, the client device 110, and/or the client device 112. For example, a client device and/or a server device can be a computing system including multiple computing devices and/or a single computing device, such as a mobile phone, a tablet computer, a laptop computer, a notebook computer, a desktop computer, a server computer, and/or other suitable computing devices. A computing device 400 can include components and/or units, such as a processor 402, a bus 404, a memory 406, peripherals 414, a power source 416, a network communication unit 418, a user interface 420, other suitable components, and/or any combination thereof.

The processor 402 can be a central processing unit (CPU), such as a microprocessor, and can include single or multiple processors, having single or multiple processing cores. Alternatively, the processor 402 can include another type of device, or multiple devices, now existing or hereafter developed, capable of manipulating or processing information. For example, the processor 402 can include multiple processors interconnected in any manner, including hardwired and/or networked, including wirelessly networked. In some implementations, the operations of the processor 402 can be distributed across multiple physical devices and/or units that can be coupled directly or across a local area or other type of network. In some implementations, the processor 402 can include a cache, or cache memory, for local storage of operating data and/or instructions. The operations of the processor 402 can be distributed across multiple machines, which can be coupled directly or across a local area or other type of network.

The memory 406 can include volatile memory, non-volatile memory, and/or a combination thereof. For example, the memory 406 can include volatile memory, such as one or more DRAM modules such as DDR SDRAM, and non-volatile memory, such as a disk drive, a solid state drive, flash memory, Phase-Change Memory (PCM), and/or any form of non-volatile memory capable of persistent electronic information storage, such as in the absence of an active power supply. The memory 406 can include another type of device, or multiple devices, now existing or hereafter developed, capable of storing data and/or instructions for processing by the processor 402. The processor 402 can access and/or manipulate data in the memory 406 via the bus 404. Although shown as a single block in FIG. 4, the memory 406 can be implemented as multiple units. For example, a computing device 400 can include volatile memory, such as RAM, and persistent memory, such as a hard drive or other storage. The memory 406 can be distributed across multiple machines, such as network-based memory or memory in multiple machines performing the operations of clients and/or servers.

The memory 406 can include executable instructions 408; data, such as application data 410; an operating system 412;

or a combination thereof for immediate access by the processor 402. The executable instructions 408 can include, for example, one or more application programs, which can be loaded and/or copied, in whole or in part, from non-volatile memory to volatile memory to be executed by the processor 402. The executable instructions 408 can be organized into programmable modules and/or algorithms, functional programs, codes, code segments, and/or combinations thereof to perform various functions described herein. For example, the memory 406 may include instructions executable by the processor 402 to cause a system including the computing device 400 to implement the process 500 of FIG. 5, the process 600 of FIG. 6, the process 1000 of FIG. 10, or the process 1100 of FIG. 11.

The application data 410 can include, for example, user files; database catalogs and/or dictionaries; configuration information for functional programs, such as a web browser, a web server, a database server; and/or a combination thereof. The operating system 412 can be, for example, Microsoft Windows®, Mac OS X®, or Linux®; an operating system for a small device, such as a smartphone or tablet device; or an operating system for a large device, such as a mainframe computer. The memory 406 can comprise one or more devices and can utilize one or more types of storage, such as solid state or magnetic storage.

The peripherals 414 can be coupled to the processor 402 via the bus 404. The peripherals can be sensors or detectors, or devices containing any number of sensors or detectors, which can monitor the computing device 400 itself and/or the environment around the computing device 400. For example, a computing device 400 can contain a geospatial location identification unit, such as a global positioning system (GPS) location unit. As another example, a computing device 400 can contain a temperature sensor for measuring temperatures of components of the computing device 400, such as the processor 402. Other sensors or detectors can be used with the computing device 400, as can be contemplated. In some implementations, a client and/or server can omit the peripherals 414. In some implementations, the power source 416 can be a battery, and the computing device 400 can operate independently of an external power distribution system. Any of the components of the computing device 400, such as the peripherals 414 or the power source 416, can communicate with the processor 402 via the bus 404. Although depicted here as a single bus, the bus 404 can be composed of multiple buses, which can be connected to one another through various bridges, controllers, and/or adapters.

The network communication unit 418 can also be coupled to the processor 402 via the bus 404. In some implementations, the network communication unit 418 can comprise one or more transceivers. The network communication unit 418 provides a connection or link to a network, such as the network 106, via a network interface, which can be a wired network interface, such as Ethernet, or a wireless network interface. For example, the computing device 400 can communicate with other devices via the network communication unit 418 and the network interface using one or more network protocols, such as Ethernet, TCP, IP, power line communication (PLC), WiFi, infrared, GPRS, GSM, CDMA, TDMA, UMTS, or other suitable protocols.

A user interface 420 can include a display; a positional input device, such as a mouse, touchpad, touchscreen, or the like; a keyboard; and/or any other human and machine interface devices. The user interface 420 can be coupled to the processor 402 via the bus 404. Other interface devices that permit a user to program or otherwise use the computing device 400 can be provided in addition to or as an alternative to a display. In some implementations, the user interface 420 can include a display, which can be a liquid crystal display (LCD), a cathode-ray tube (CRT), a light emitting diode (LED) display (e.g., an OLED display), or other suitable display. The user interface 420 may include an audio driver (e.g., a speaker) configured to convert electronic audio data to sound in medium (e.g., air). For example, a speaker of the user interface 420 may be used to play audio data (e.g., encoding music or speech signals).

Figure 5:
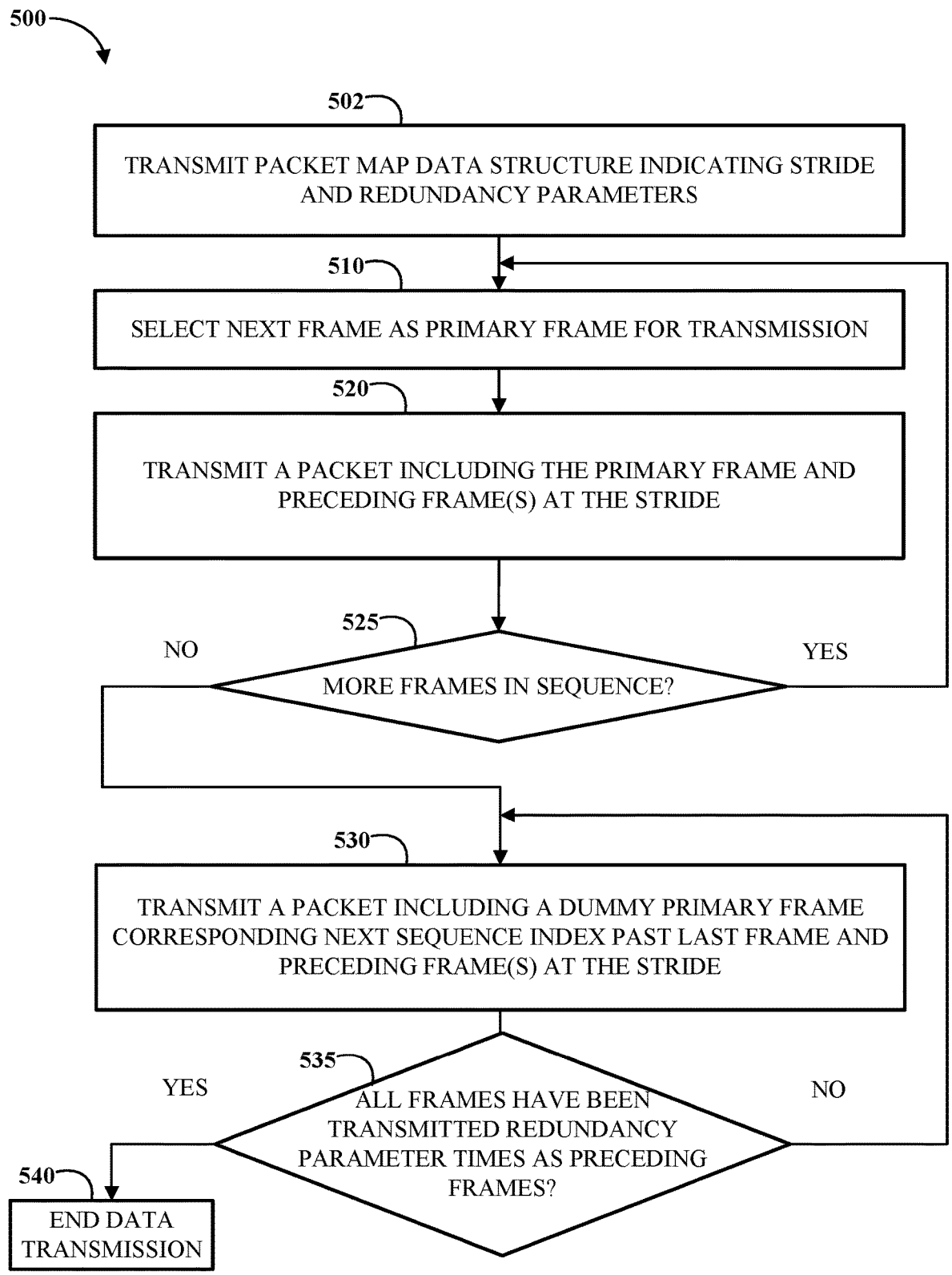
FIG. 5 is a flowchart illustrating an example of a process for transmitting data partitioned into a sequence of frames of data using packet payload mapping for robust transmission of data.

FIG. 5 is a flowchart illustrating an example of a process 500 for transmitting data partitioned into a sequence of frames of data using packet payload mapping for robust transmission of data. The process 500 includes transmitting 502 a packet map data structure that indicates a stride parameter and a redundancy parameter; for a sequence of frames of data, selecting 510 a next frame from the sequence as a primary frame for transmission, and transmitting 520 a packet including a primary frame and one or more preceding frames at a spacing in the sequence of frames of data corresponding to the stride parameter; when (at operation 525) the last frame has been transmitted 520 as a primary frame, transmitting 530 packets including a dummy primary frame corresponding to a next sequence index past the last frame of the sequence along with one or more preceding frames at the stride spacing from the dummy index, until (at operation 535) the last frame of the sequence of frames has been transmitted a number of times equal to one plus the redundancy parameter; and ending 540 the data transmission. For example, the process 500 of FIG. 5 may be implemented by the server device 102 of FIG. 1. For example, the process 500 of FIG. 5 may be implemented by the computing device 400 of FIG. 4.

The process 500 includes transmitting 502 a packet map data structure that indicates the stride parameter and indicates a count of redundant preceding frames to be transmitted in each packet of a set of packets that include frames from a sequence of frames of data. The stride parameter may specify a spacing in the sequence of frames between a primary packet and one or more preceding packets included in a packet of the packets. In some implementations, the stride parameter is greater than four. The count of redundant preceding frames may be referred to as the redundancy parameter for a packet payload mapping scheme. For example, the packet map data structure may include a list of integers that are frame index offsets of corresponding preceding frames, with one integer for each preceding frame (e.g., {−5, −10, −15} for a scheme with stride 5 and redundancy 3 or {−16, −32, −48, −64} for a scheme with stride 16 and redundancy 4). In some implementations, the packet map data structure includes two positive integers representing the stride parameter and the redundancy parameter respectively. The packet map data structure may be transmitted 502 using a network interface (e.g., the network interface 104). In some implementations, the packet map data structure is transmitted 502 once in a separate packet before the frames of data start to be transmitted 520. In some implementations, the packet map data structure is transmitted 502 as part of a header for each of the packets in the set of packets used to transmit the sequence of frames. For example, the sequence of frames of data may be a sequence of frames of audio data (e.g., encoding music or speech signals). For example, the sequence of frames of data may be a sequence of frames of video data.

The process 500 includes selecting 510 a next frame as a primary frame for transmission in the next packet. For example, a next frame pointer or counter may be initialized to point to a frame at the beginning of the sequence of frames of data, and the frame pointer or counter may be incremented or otherwise updated to select 510 the next frame for transmission as a primary frame. In some implementations, an order of transmission for packets bearing the frames of data may be randomized to mitigate the effects of large burst packet loss events on the packet mapping scheme. For example, the process 500 may include, prior to transmitting a first packet and a second packet, randomly determining an order of transmission for the first packet and the second packet. Frames of data for packets to be transmitted may be buffered to enable out-of-frame-order transmission. Various sizes for the send-side buffer may be used, depending on the level of burst loss tolerance desired and the tolerance for end-to-end latency in an application. For example, a sender-side buffer may be sized to store data for a number of packets matching a number of packets stored by a ring buffer for the packet mapping scheme in a corresponding receiver device. In some implementations, randomly determining the order of transmission includes randomly generating an index to a buffer with entries that store data associated with respective packets, including the first packet and the second packet, to select a next packet for transmission. A packet may be generated based on the frames of data related to its primary frame by the packet mapping scheme encoded by the packet map data structure either before the random order for transmission is determined or after the random order for transmission is determined. For example, selecting 510 a next frame as a primary frame for transmission in the next packet may include implementing the process 1200 of FIG. 12A to randomize the transmission order. For example, selecting 510 a next frame as a primary frame for transmission in the next packet may include implementing the process 1250 of FIG. 12B to randomize the transmission order.

The process 500 includes transmitting 520 a packet that includes a primary frame (e.g., the currently selected 510 frame) and one or more preceding frames from the sequence of frames of data. The one or more preceding frames of the first packet are separated from the primary frame of the first packet in the sequence of frames by respective multiples of the stride parameter (e.g., as illustrated for the packet encoding scheme 200 for a stride parameter of 5). For example, the packet may be transmitted 520 using a network interface (e.g., the network interface 104). In some implementations, the one or more preceding frames of the packet include two or more preceding frames from the sequence of frames of data. The packet may include other data, such as header data (e.g., an IPv6 header and a UDP header) to facilitate transmission of the packet across a network (e.g., the network 106). If (at operation 525) there are more frames in the sequence of frames of data to transmit, then the next frame may be selected 510 and transmitted 520 as a primary frame in another packet, along with one or more corresponding preceding frames with respect to the new primary frame. When the process 500 is starting up, one or more of the preceding frames may be omitted from the packet where there is no corresponding earlier frame in the sequence of frames to re-transmit. After a number of packets corresponding to the stride parameter have been transmitted, a frame that has previously been transmitted in an earlier packet (e.g., a first packet) as a primary frame may be retransmitted as preceding frame in a later packet (e.g., a second packet). For example, the process 500 may include transmitting 520, using the network interface, a second packet that includes a primary frame and one or more preceding frames from the sequence of frames of data, wherein the one or more preceding frames of the second packet are separated from the primary frame of the second packet in the sequence of frames by respective multiples of the stride parameter, and wherein the primary frame of the first packet is one of the one or more preceding frames of the second packet. In some implementations, the process 500 includes transmitting 520, using the network interface, all frames between the primary frame of the first packet and the primary frame of the second packet in the sequence of frames of data as primary frames of respective packets that each include one or more preceding frames from the sequence of frames of data separated in the sequence of frames by multiples of the stride parameter. The packets may be transmitted 520 via the network to one or more client devices. For example, the first packet and the second packet may be broadcast packets. For example, the first packet and the second packet may be multicast packets. In some implementations, frames in the sequence of frames of data are all a same size.

When (at operation 525) all of the frames of the sequence of frames have been transmitted 520 as primary frames of respective packets, one or more packets including a dummy primary frame (or omitting a primary frame) corresponding to a next sequence index past the last frame of the sequence with corresponding preceding frames at the stride may be transmitted 530, until (at operation 535) all frames have been transmitted a number of times as preceding frames corresponding to the redundancy parameter. When (at operation 535) all the frames of the sequence have been transmitted the redundancy parameter times as preceding frames, then the transmission of the sequence of frames of data ends 540.

Figure 6:
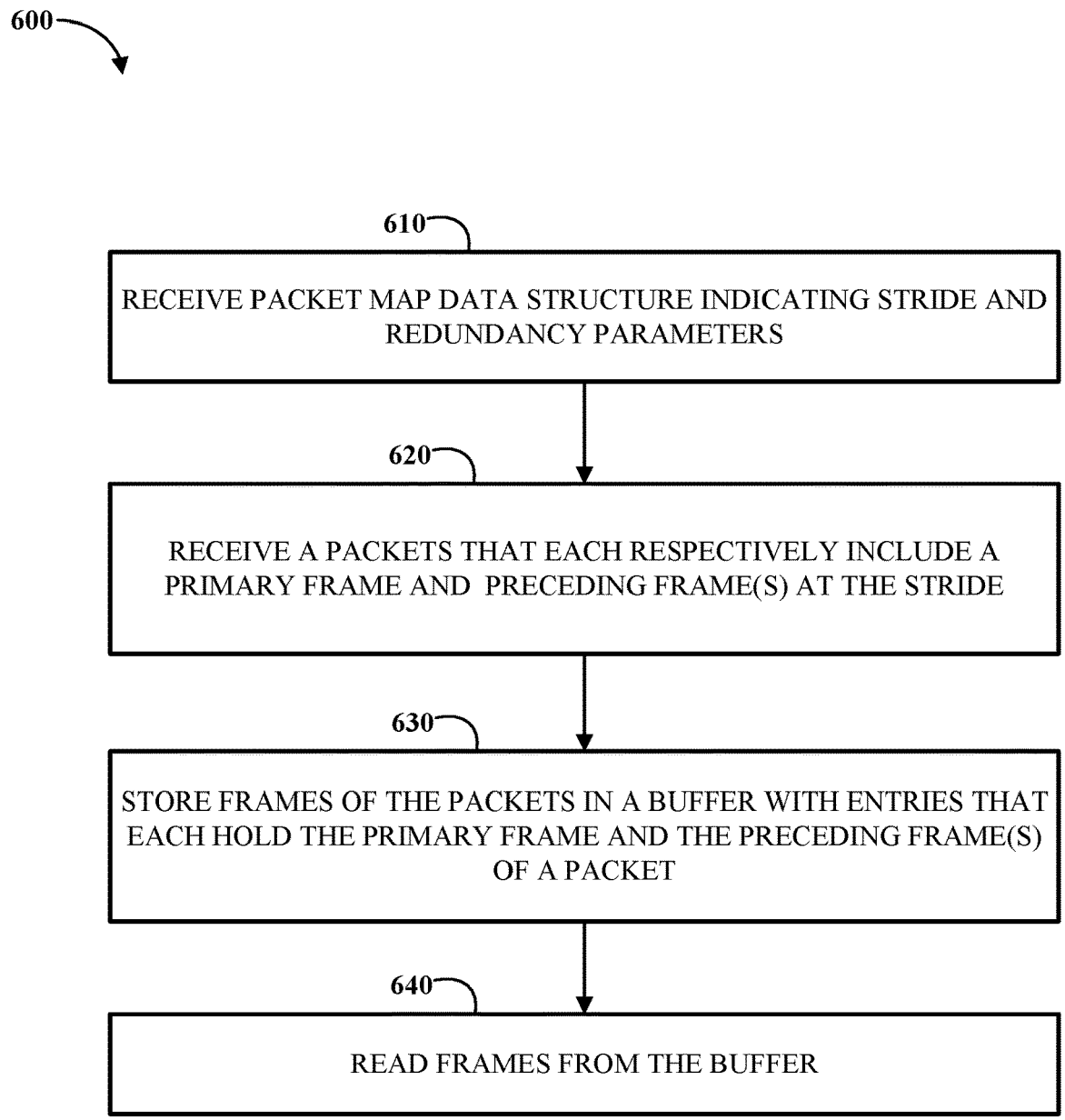
FIG. 6 is a flowchart illustrating an example of a process for receiving data partitioned into a sequence of frames of data using packet payload mapping for robust transmission of data.

FIG. 6 is a flowchart illustrating an example of a process 600 for receiving data partitioned into a sequence of frames of data using packet payload mapping for robust transmission of data. The process 600 includes receiving 610 a packet map data structure that indicates a stride parameter and a redundancy parameter; receiving 620 packets that each respectively include a primary frame and one or more preceding frames from the sequence of frames of data in accordance with a stride parameter; storing 630 the frames of the packets in a buffer with entries that each hold the primary frame and the one or more preceding frames of a packet; and reading 640 frames from the buffer to obtain a single copy of the frames at the output of the buffer. For example, the process 600 of FIG. 6 may be implemented by the client device 110 of FIG. 1. For example, the process 600 of FIG. 6 may be implemented by the computing device 400 of FIG. 4.

The process 600 includes receiving 610, using the network interface, a packet map data structure that indicates the stride parameter and indicates a count of redundant preceding frames to be transmitted in each of the packets. The stride parameter may specify a spacing in the sequence of frames between a primary packet and one or more preceding packets included in a packet of the packets. In some implementations, the stride parameter is greater than four. The count of redundant preceding frames may be referred to as the redundancy parameter for a packet payload mapping scheme. For example, the packet map data structure may include a list of integers that are frame index offsets of corresponding preceding frames, with one integer for each preceding frame (e.g., {−5, −10, −15} for a scheme with stride 5 and redundancy 3 or {−16, −32, −48, −64} for a scheme with stride 16 and redundancy 4). In some implementations, the packet map data structure includes two positive integers representing the stride parameter and the redundancy parameter respectively. For example, the packet map data structure may be received 610 using a network interface (e.g., the network interface 120). In some implementations, the packet map data structure is received 610 once in a separate packet before the frames of data start to be received 620. In some implementations, the packet map data structure is received 610 as part of a header for each of the packets in the set of packets used to transmit the sequence of frames. For example, the sequence of frames of data may be a sequence of frames of audio data (e.g., encoding music or speech signals). For example, the sequence of frames of data may be a sequence of frames of video data.

The process 600 includes receiving 620 packets that each respectively include a primary frame and one or more preceding frames from the sequence of frames of data. The one or more preceding frames of a respective packet are separated from the primary frame of the respective packet in the sequence of frames by a respective multiple of the stride parameter (e.g., as illustrated for the packet encoding scheme 200 for a stride parameter of 5). For example, the packets may be received 620 using a network interface (e.g., the network interface 120). In some implementations, the one or more preceding frames of each respective packet include a number of preceding frames equal to the redundancy parameter, and the redundancy parameter is greater than one. The packets may be received 620 via a network from one or more server devices (e.g., the server device 102).

The process 600 includes storing 630 the frames of the packets in a buffer (e.g., the ring buffer 302) with entries that each hold the primary frame and the one or more preceding frames of a packet. In some implementations, the one or more preceding frames of each respective packet include a number of preceding frames equal to a redundancy parameter, and wherein the buffer is sized to store frames from a number of packets equal to the stride parameter times the redundancy parameter plus one. In some implementations, the received 620 packets may be passed through a jitter buffer before the frames from the payload of the packets are stored 630 in the buffer. For example, the process 600 may include storing the packets in a jitter buffer as they are received 620; and reading the packets from the jitter buffer before storing 630 the frames of the packets in the buffer. In some implementations, frames in the sequence of frames of data are all a same size.

The process 600 includes reading 640 frames from the buffer (e.g., the ring buffer 302). For example, the process 700 of FIG. 7 may be implemented to read 640 frames from the buffer. In some implementations, the frames of data from the sequence include audio data, and the process 600 includes playing audio data of a frame responsive to reading the frame from the buffer. In some implementations, frames of data read 640 from the buffer are reassembled in the sequence of frames of data in a reassembly buffer (e.g., the reassembly buffer 820 of FIG. 8). For example, the process 900 of FIG. 9 may be implemented to reassemble a sequence of frames of data to facilitating playing audio data.

Figure 7:
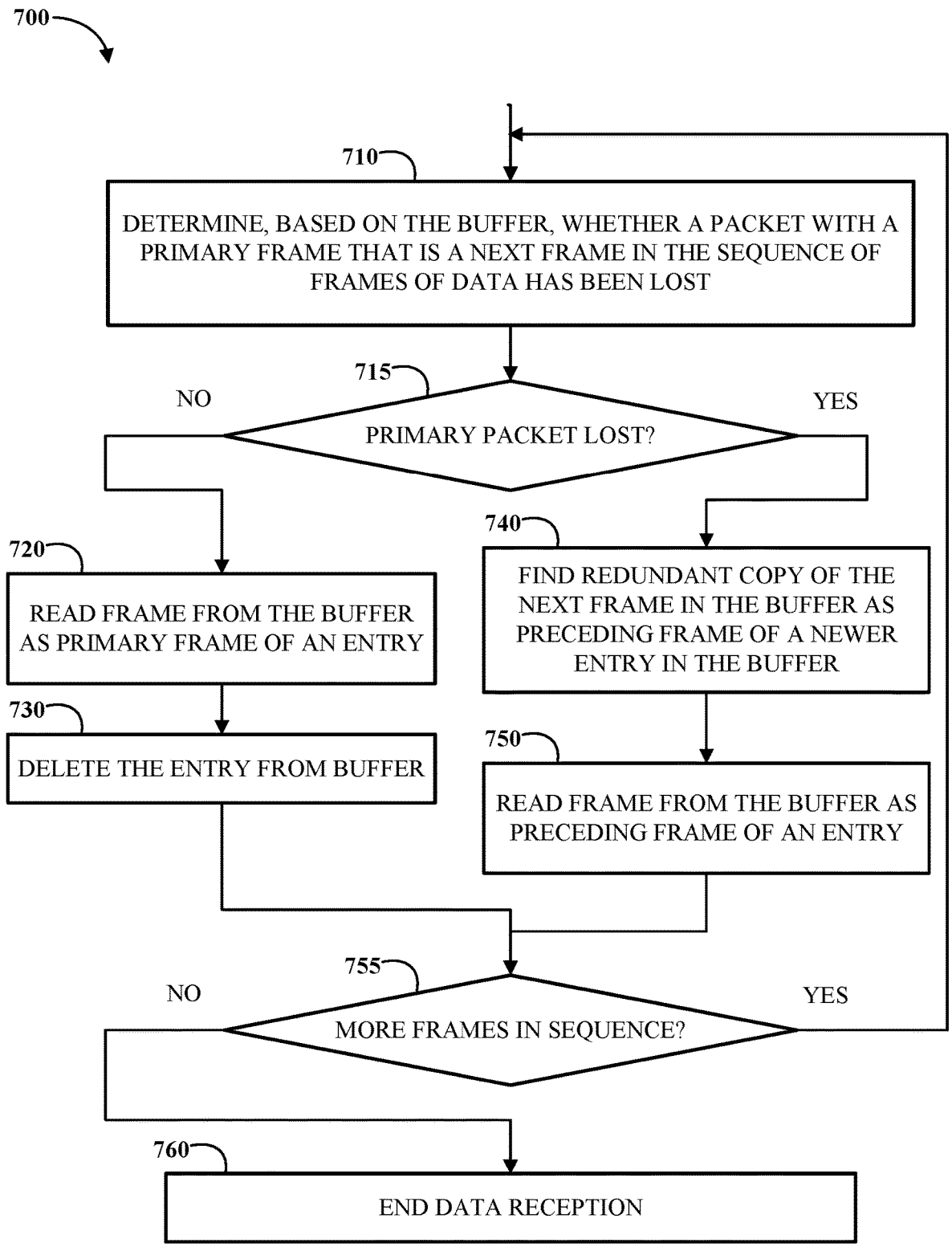
FIG. 7 is a flowchart illustrating an example of a process for reading frames of data from a buffer with entries that each hold a primary frame and the one or more preceding frames of a packet.

FIG. 7 is a flowchart illustrating an example of a process 700 for reading frames of data from a buffer with entries that each hold a primary frame and the one or more preceding frames of a packet. The process 700 includes determining 710, based on the buffer, whether a packet with a primary frame that is a next frame in the sequence of frames of data has been lost; when (at operation 715) the packet has not been lost, reading 720 the frame from the buffer as the primary frame from one of the entries of the buffer; when (at operation 715) the packet has been lost, finding 740 a redundant copy of the next frame in the buffer as a preceding frame of a newer entry in the buffer, and reading 750 the next frame from the buffer as a preceding frame of an entry; and when (at operation 755) there are no more frames in the sequence of frames to read, ending 760 data reception. For example, the process 700 of FIG. 7 may be implemented by the client device 110 of FIG. 1. For example, the process 700 of FIG. 7 may be implemented by the computing device 400 of FIG. 4.

The process 700 includes determining 710, based on the buffer (e.g., the ring buffer 302), that a packet with a primary frame that is a next frame in the sequence of frames of data has been lost. For example, the oldest entry in the buffer may be checked to determine 710 whether the packet corresponding to the oldest entry was lost. In some implementations, the entry includes either a pointer to valid data from a received packet or a null pointer if the corresponding packet was lost. In some implementations, the buffer includes an indication (e.g., a flag) of whether the entry is currently storing valid frames of data, which may be set when data from a received packet is stored in the entry and reset when the entry is deleted 730 (e.g., after a read of the primary frame). In some implementations, determining 710 a packet has been lost includes performing a data integrity check (e.g., a cyclic redundancy check (CRC)) on data stored in an entry corresponding to packet of interest.

The process 700 includes, when (at operation 715) the packet has not been lost, reading 720 the frame (e.g., a first frame) from the buffer as the primary frame from one of the entries of the buffer. The process 700 includes, responsive to the primary frame of an entry (e.g., a first entry) of the buffer being read 720 from the buffer, deleting 730 the entry from the buffer. For example, the entry may be deleted 730 by releasing the memory of the entry for reuse (e.g., to store frames of a newly received packet).

The process 700 includes, when (at operation 715) the packet has been lost, finding 740 a redundant copy of the next frame in the buffer as a preceding frame of a newer entry in the buffer. For example, there may be up to redundancy parameter copies of the frame stored in the buffer as preceding frames of later packets (e.g., as illustrated by the inner rings of the ring buffer 302 and as discussed in relation to FIGS. 3A-B). One or more of these entries corresponding to packets bearing the frame as a preceding frame under the packet payload mapping scheme may be checked to find 740 a valid copy of the frame. The process 700 includes, responsive to the determination that the packet was lost, reading 750 the next frame from the buffer as a preceding frame from one of the entries of the buffer. Although not explicitly shown in FIG. 7 the process 700 may handle cases where none of the copies of the frame have been successfully received and no copy is found 740 in the buffer by returning an error message and/or interpolating the missing data based on earlier and/or later data in the sequence of frames of data.

When (at operation 755) there are no more frames in the sequence of frames of data to be read, data reception may be ended 760.

Figure 8:
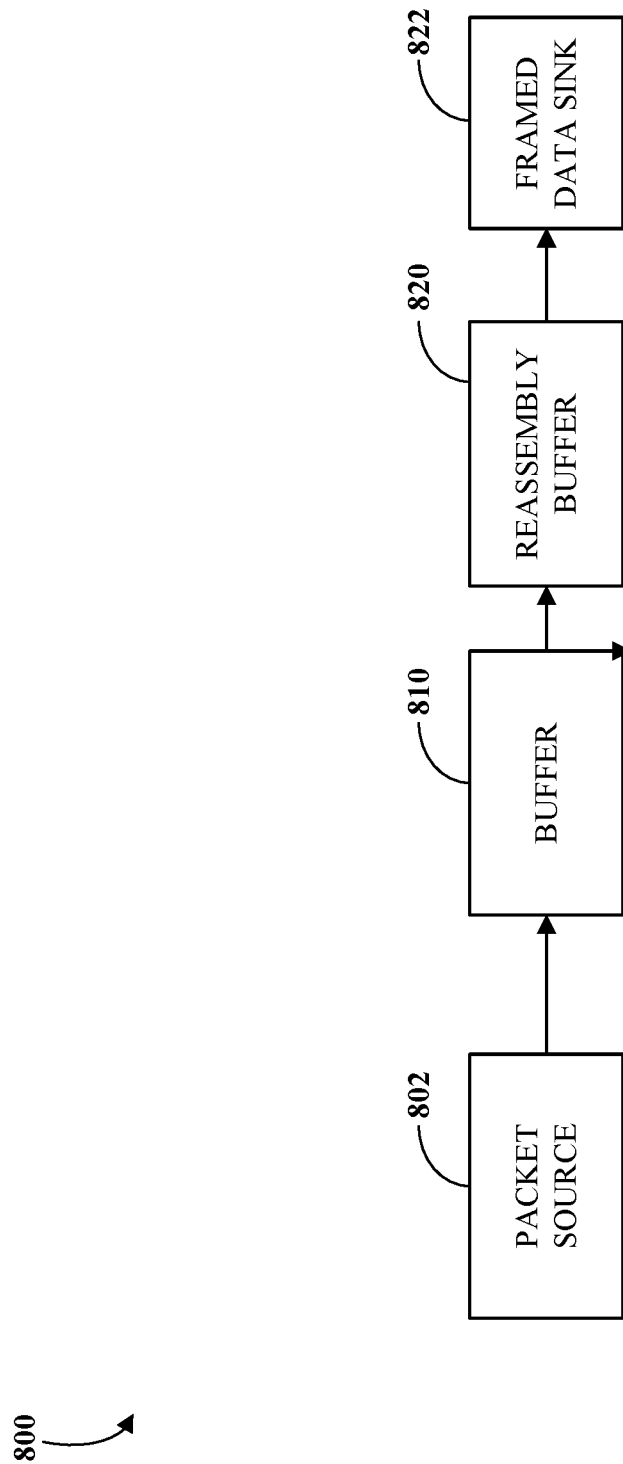
FIG. 8 is a block diagram of an example of a data flow in a computing device configured to receive data partitioned into a sequence of frames of data using packet payload mapping for robust transmission of data.

FIG. 8 is a block diagram of an example of a data flow 800 in a computing device configured to receive data partitioned into a sequence of frames of data using packet payload mapping for robust transmission of data. A packet source 802 outputs packets that each respectively include a primary frame and one or more preceding frames from the sequence of frames of data. The one or more preceding frames of a respective packet are separated from the primary frame of the respective packet in the sequence of frames by a respective multiple of the stride parameter (e.g., as illustrated for the packet encoding scheme 200 for a stride parameter of 5). For example, the packet source may be a network communications unit (e.g., the network communications unit 418) that receives the packets via a network (e.g., the network 106) from a server device (e.g., the server device 102). In some implementations, the packet source 802 includes a jitter buffer that is configured to output the packets in transmitted order.

The data flow 800 includes a buffer (e.g., the ring buffer 302) with entries that each hold the primary frame and the one or more preceding frames of a packet. The preceding frames may be redundant copies of frame sent in earlier packets as primary frames. Thus, the buffer 810 may store multiple copies of frames in the sequence of frames of data (e.g., as discussed in relation to FIGS. 3A-B). This redundancy may make the data flow 800 robust to substantial bursts of packet loss in the packet source 802.

The data flow 800 includes a reassembly buffer 820 with entries that each hold a frame of the sequence of frames of data. Single copies of the frames may be read from the buffer 810 and written to the reassembly buffer 820 to remove the redundancy that was used for transmission on the noisy network and/or to properly order the frames, thus reassembling the frames into a useable form of the source data (e.g., reassembling a file that partitioned into frames or queuing a larger super frame of audio or video data for play out in a user interface). For example, the reassembly buffer 820 may have a size corresponding to a number of frames equal to the stride parameter. In some implementations that use a multi-stride packet-frame map, the reassembly buffer 820 may be sized to store a number of frames equal to a largest stride parameter of a packet-frame map used by the received packets. For example, the reassembly buffer 820 may be a first-in-first-out (FIFO) buffer. For example, the reassembly buffer 820 may be implemented as a circular buffer.

The data flow 800 includes a data sink 822 that consumes the framed data from the reassembly buffer 820. For example, the data sink 822 may include an audio driver (e.g., including a speaker) that is used to play audio data in the frames. For example, the data sink 822 may be file in non-volatile memory that is being written to with the framed data.

Figure 9:
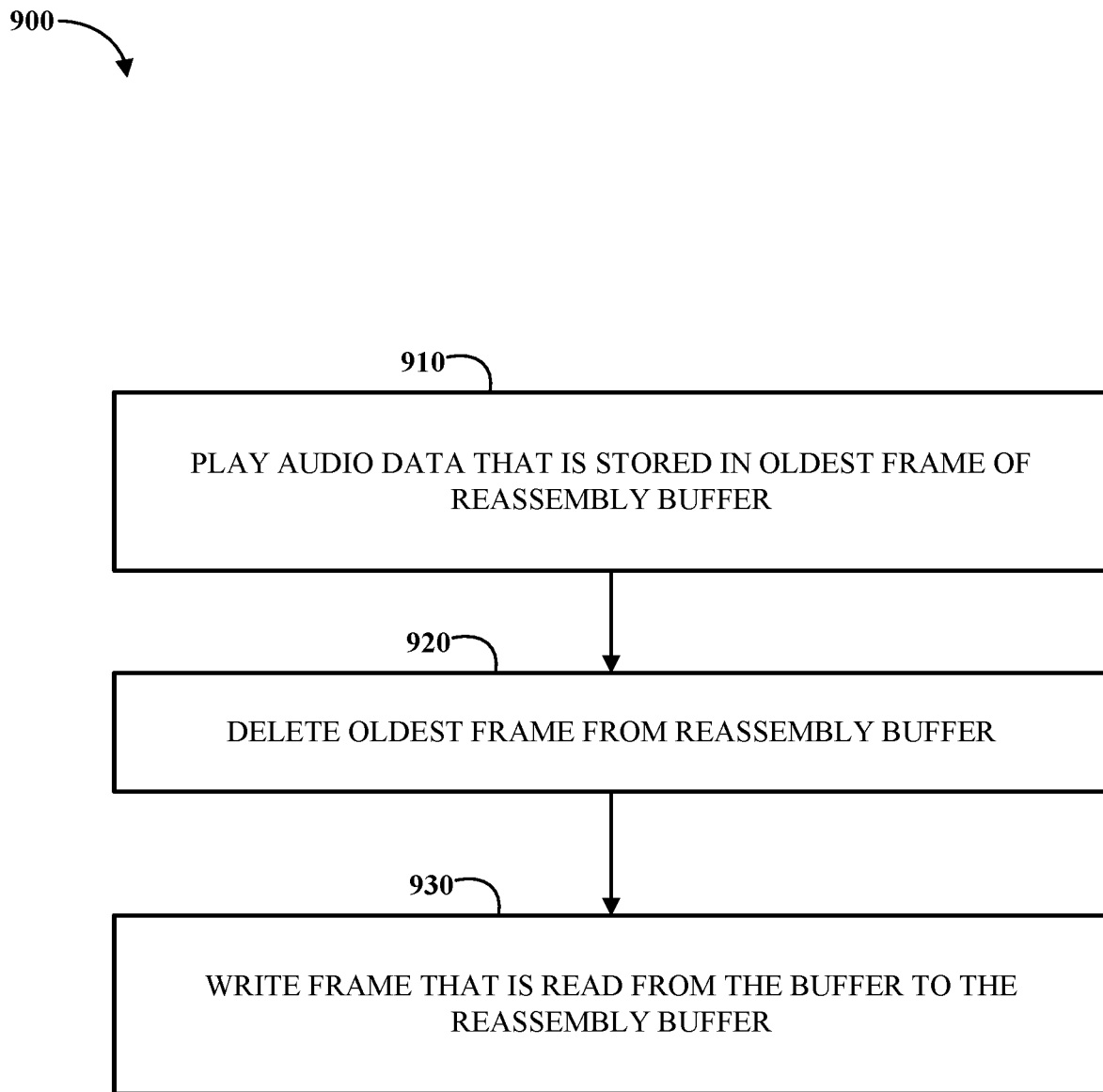
FIG. 9 is a flowchart illustrating an example of a process for passing framed data through a reassembly buffer after removing packet payload redundancy.

FIG. 9 is a flowchart illustrating an example of a process 900 for passing framed data through a reassembly buffer after removing packet payload redundancy. The process 900 includes playing 910 audio data that is stored in an oldest frame from the reassembly buffer; deleting 920 the oldest frame from the reassembly buffer; and writing 930 frames that are read from the buffer to a reassembly buffer. For example, the process 900 of FIG. 9 may be implemented by the client device 110 of FIG. 1. For example, the process 900 of FIG. 9 may be implemented by the computing device 400 of FIG. 4.

The process 900 includes playing 910 audio data that is stored in an oldest frame from a reassembly buffer (e.g., the reassembly buffer 820). For example, the audio data may be played 910 using an audio driver (e.g., a speaker) of the user interface 420. The process 900 includes deleting 920 the oldest frame from the reassembly buffer. For example, the entry may be deleted 920 by releasing the memory of the entry for reuse (e.g., by updating a pointer or counter of the reassembly buffer).

The process 900 includes writing frames (e.g., including a first frame and a next frame) that are read from a buffer (e.g., the buffer 810) to a reassembly buffer (e.g., the reassembly buffer). The reassembly buffer may include entries that each consist of a frame of the sequence of frames of data. In some implementations, the reassembly buffer is sized to store a number of frames equal to a stride parameter.

Figure 10:
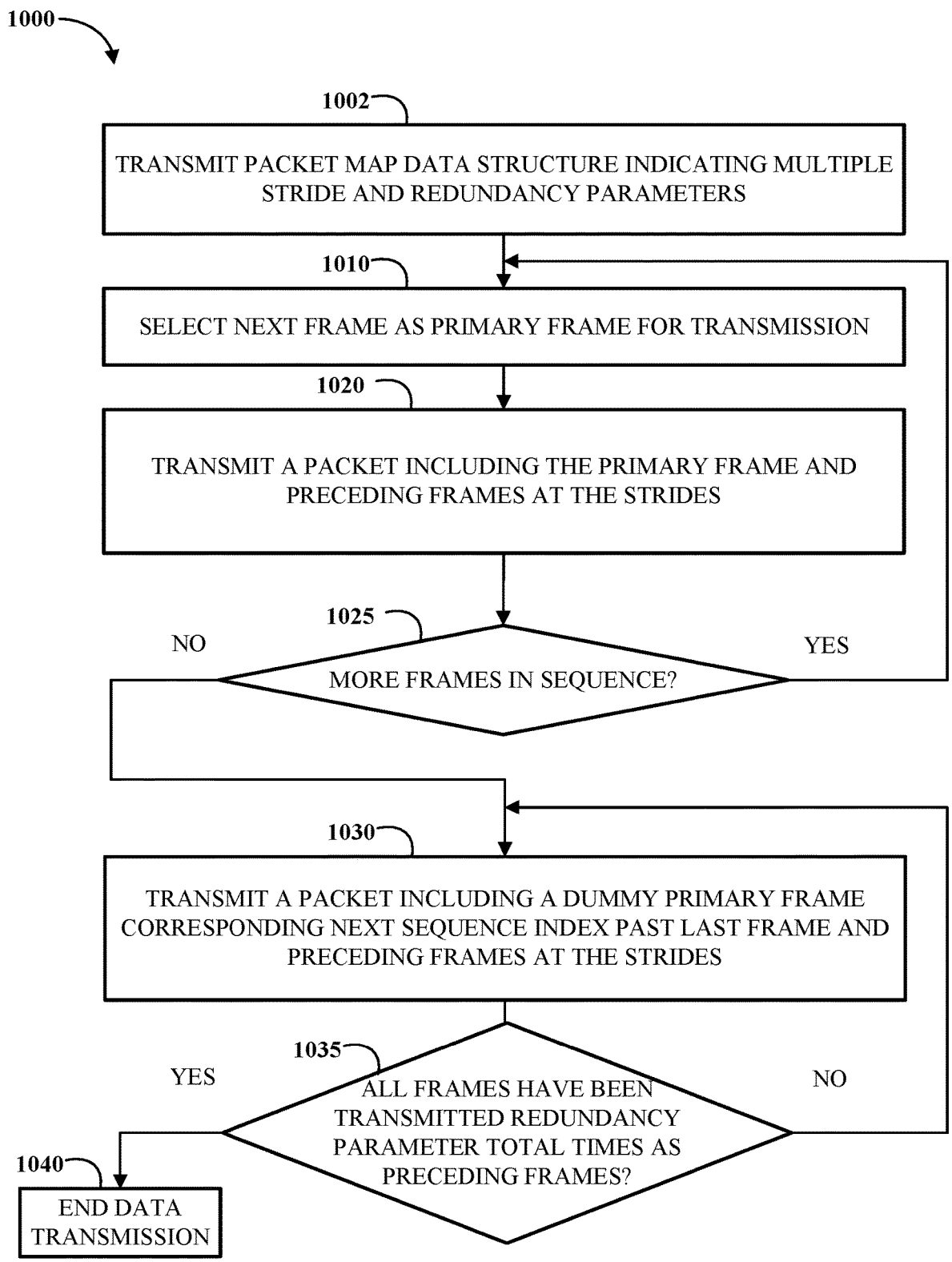
FIG. 10 is a flowchart illustrating an example of a process for transmitting data partitioned into a sequence of frames of data using packet payload mapping with multiple strides for robust transmission of data.

FIG. 10 is a flowchart illustrating an example of a process 1000 for transmitting data partitioned into a sequence of frames of data using packet payload mapping with multiple strides for robust transmission of data. The process 1000 includes transmitting 1002 a packet map data structure that indicates multiple stride parameters and corresponding redundancy parameters (e.g., strides and corresponding segments); for a sequence of frames of data, selecting 1010 a next frame from the sequence as a primary frame for transmission, and transmitting 1020 a packet including a primary frame and two or more preceding frames at spacings in the sequence of frames of data corresponding to the multiple stride parameters; when (at operation 1025) the last frame has been transmitted 1020 as a primary frame, transmitting 1030 packets including a dummy primary frame corresponding to a next sequence index past the last frame of the sequence along with one or more preceding frames at the stride spacings from the dummy index, until (at operation 1035) the last frame of the sequence of frames has been transmitted a number of times equal to one plus the sum of the redundancy parameters for the multiple stride parameters; and ending 1040 the data transmission. For example, the process 1000 of FIG. 10 may be implemented by the server device 102 of FIG. 1. For example, the process 1000 of FIG. 10 may be implemented by the computing device 400 of FIG. 4.

The process 1000 includes transmitting 1002, a packet map data structure that indicates multiple stride parameters, including a first stride parameter and a second stride parameter, and indicates counts of redundant preceding frames for each stride parameter to be transmitted in each packet of a set of packets that include frames from a sequence of frames of data. Each stride parameter may specify a spacing in the sequence of frames between a primary packet and one or more preceding packets included in a packet of the packets. In some implementations, the first stride parameter is less than three and the second stride parameter is greater than four. The counts of redundant preceding frames may be referred to as the redundancy parameters for respective stride parameters for a packet payload mapping scheme. For example, the packet map data structure may include a list of integers that are frame index offsets of corresponding preceding frames, with one integer for each preceding frame (e.g., {−1, −2, −5, −10, −15} for a scheme with a first stride of 1 with a corresponding redundancy of 2 and a second stride of 5 with a corresponding redundancy of 3 or {−2, −4, −6, −16, −32, −48, −64} for a scheme with a first stride of 2 with a corresponding redundancy of 3 and a second stride of 16 with a corresponding redundancy of 4). In some implementations, the packet map data structure includes two positive integers for each stride parameter representing a stride parameter and its corresponding redundancy parameter respectively. The packet map data structure may be transmitted 1002 using a network interface (e.g., the network interface 104). In some implementations, the packet map data structure is transmitted 1002 once in a separate packet before the frames of data start to be transmitted 1020. In some implementations, the packet map data structure is transmitted 1002 as part of a header for each of the packets in the set of packets used to transmit the sequence of frames. For example, the sequence of frames of data may be a sequence of frames of audio data (e.g., encoding music or speech signals). For example, the sequence of frames of data may be a sequence of frames of video data.

The process 1000 includes selecting 1010 a next frame as a primary frame for transmission in the next packet. For example, a next frame pointer or counter may be initialized to point to a frame at the beginning of the sequence of frames of data, and the frame pointer or counter may be incremented or otherwise updated to select 1010 the next frame for transmission as a primary frame. In some implementations, an order of transmission for packets bearing the frames of data may be randomized to mitigate the effects of large burst packet loss events on the packet mapping scheme. For example, the process 1000 may include, prior to transmitting a first packet and a second packet, randomly determining an order of transmission for the first packet and the second packet. Frames of data for packets to be transmitted may be buffered to enable out-of-frame-order transmission. Various sizes for the send-side buffer may be used, depending on the level of burst loss tolerance desired and the tolerance for end-to-end latency in an application. For example, a sender-side buffer may be sized to store data for a number of packets matching a number of packets stored by a ring buffer for the packet mapping scheme in a corresponding receiver device. In some implementations, randomly determining the order of transmission includes randomly generating an index to a buffer with entries that store data associated with respective packets, including the first packet and the second packet, to select a next packet for transmission. A packet may be generated based on the frames of data related to its primary frame by the packet mapping scheme encoded by the packet map data structure either before the random order for transmission is determined or after the random order for transmission is determined. For example, selecting 1010 a next frame as a primary frame for transmission in the next packet may include implementing the process 1200 of FIG. 12A to randomize the transmission order. For example, selecting 1010 a next frame as a primary frame for transmission in the next packet may include implementing the process 1250 of FIG. 12B to randomize the transmission order.

The process 1000 includes transmitting 1020 a packet (e.g., a first packet) that includes a primary frame (e.g., the currently selected 1010 frame) and two or more preceding frames from the sequence of frames of data. The two or more preceding frames may be selected from the sequence of frames of data for inclusion in the packet based on a multi-stride packet-frame map specified by the packet map data structure. In some implementations, at least one of the two or more preceding frames of the packet is separated from the primary frame of the packet in the sequence of frames by a respective multiple of a first stride parameter and at least one of the two or more preceding frames of the packet is separated from the primary frame of the packet in the sequence of frames by a respective multiple of a second stride parameter that is different from the first stride parameter. For example, the packet may be transmitted 1020 using a network interface (e.g., the network interface 104). In some implementations, more than two strides may be used in each packet. For example, at least one of the two or more preceding frames of the packet may be separated from the primary frame of the packet in the sequence of frames by a respective multiple of a third stride parameter that is different from the first stride parameter and the second stride parameter. The packet may include other data, such as header data (e.g., an IPv6 header and a UDP header) to facilitate transmission of the packet across a network (e.g., the network 106).

If (at operation 1025) there are more frames in the sequence of frames of data to transmit, then the next frame may be selected 1010 and transmitted 1020 as a primary frame in another packet, along with one or more corresponding preceding frames with respect to the new primary frame. When the process 1000 is starting up, one or more of the preceding frames may be omitted from the packet where there is no corresponding earlier frame in the sequence of frames to re-transmit. After a number of packets corresponding to the stride parameter have been transmitted, a frame that has previously been transmitted in an earlier packet (e.g., a first packet) as a primary frame may be retransmitted as preceding frame in a later packet (e.g., a second packet). For example, the process 1000 may include transmitting 1020, using the network interface, a second packet that includes a primary frame and two or more preceding frames from the sequence of frames of data, wherein at least one of the two or more preceding frames of the second packet is separated from the primary frame of the second packet in the sequence of frames by a respective multiple of the first stride parameter and at least one of the two or more preceding frames of the second packet is separated from the primary frame of the second packet in the sequence of frames by a respective multiple of the second stride parameter, and wherein the primary frame of the first packet is one of the two or more preceding frames of the second packet. In some implementations, the process 1000 includes transmitting 1020, using the network interface, all frames between the primary frame of the first packet and the primary frame of the second packet in the sequence of frames of data as primary frames of respective packets that each include two or more preceding frames from the sequence of frames of data separated in the sequence of frames by multiples of the first stride parameter and the second stride parameter. The packets may be transmitted 1020 via the network to one or more client devices. For example, the first packet and the second packet may be broadcast packets. For example, the first packet and the second packet may be multicast packets. In some implementations, frames in the sequence of frames of data are all a same size.

When (at operation 1025) all of the frames of the sequence of frames have been transmitted 1020 as primary frames of respective packets, one or more packets including a dummy primary frame (or omitting a primary frame) corresponding to a next sequence index past the last frame of the sequence with corresponding preceding frames at the stride may be transmitted 1030, until (at operation 1035) all frames have been transmitted a number of times as preceding frames corresponding to the total of the redundancy parameters (e.g., segments for respective strides) of the packet map data structure. When (at operation 1035) all the frames of the sequence have been transmitted the in every redundancy slot of the packet-frame map, then the transmission of the sequence of frames of data ends 1040.

Figure 11:
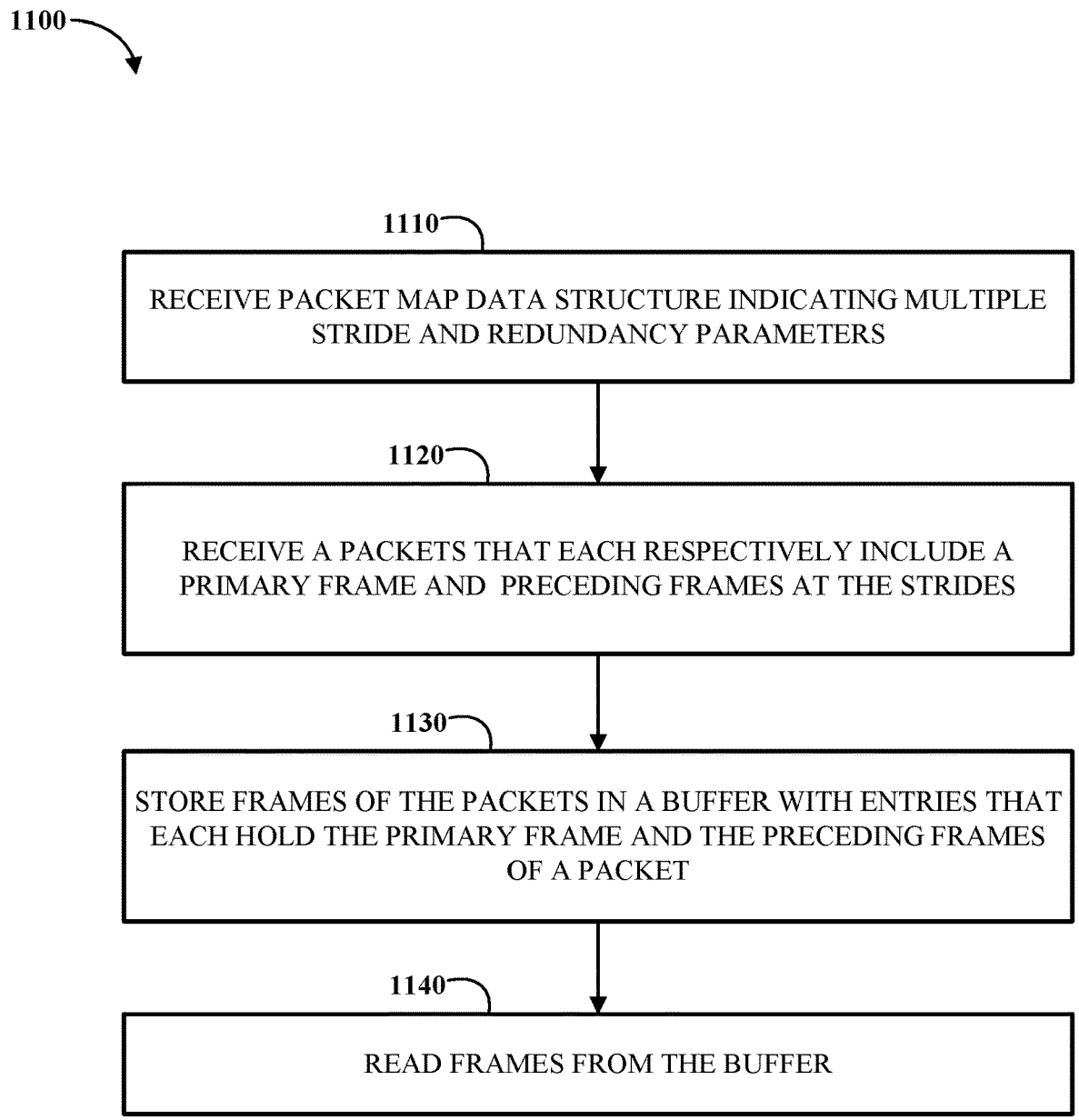
FIG. 11 is a flowchart illustrating an example of a process for receiving data partitioned into a sequence of frames of data using packet payload mapping with multiple strides for robust transmission of data.

FIG. 11 is a flowchart illustrating an example of a process 1100 for receiving data partitioned into a sequence of frames of data using packet payload mapping with multiple strides for robust transmission of data. The process 1100 includes receiving 1110 a packet map data structure that indicates multiple stride parameters and corresponding redundancy parameters (e.g., strides and corresponding segments); receiving 1120 packets that each respectively include a primary frame and two or more preceding frames from the sequence of frames of data at spacings in the sequence of frames of data corresponding to the multiple stride parameters; storing 1130 the frames of the packets in a buffer with entries that each hold the primary frame and the two or more preceding frames of a packet; and reading 1140 frames from the buffer to obtain a single copy of the frames at the output of the buffer. For example, the process 1100 of FIG. 11 may be implemented by the client device 110 of FIG. 1. For example, the process 1100 of FIG. 11 may be implemented by the computing device 400 of FIG. 4.

The process 1100 includes receiving 1110 a packet map data structure that indicates multiple stride parameters, including a first stride parameter and a second stride parameter, and indicates counts of redundant preceding frames for each stride parameter to be transmitted in each packet of a set of packets that include frames from a sequence of frames of data. Each stride parameter may specify a spacing in the sequence of frames between a primary packet and one or more preceding packets included in a packet of the packets. In some implementations, the first stride parameter is less than three and the second stride parameter is greater than four. The counts of redundant preceding frames may be referred to as the redundancy parameters (e.g., segments) for respective stride parameters for a packet payload mapping scheme. For example, the packet map data structure may include a list of integers that are frame index offsets of corresponding preceding frames, with one integer for each preceding frame (e.g., {−1, −2, −5, −10, −15} for a scheme with a first stride of 1 with a corresponding redundancy of 2 and a second stride of 5 with a corresponding redundancy of 3 or {−2, −4, −6, −16, −32, −48, −64} for a scheme with a first stride of 2 with a corresponding redundancy of 3 and a second stride of 16 with a corresponding redundancy of 4). In some implementations, the packet map data structure includes two positive integers for each stride parameter representing a stride parameter and its corresponding redundancy parameter respectively. For example, the packet map data structure may be received 1110 using a network interface (e.g., the network interface 120). In some implementations, the packet map data structure is received 1110 once in a separate packet before the frames of data start to be received 1120. In some implementations, the packet map data structure is received 1110 as part of a header for each of the packets in the set of packets used to transmit the sequence of frames. For example, the sequence of frames of data may be a sequence of frames of audio data (e.g., encoding music or speech signals). For example, the sequence of frames of data may be a sequence of frames of video data.

The process 1100 includes receiving 1120 packets that each respectively include a primary frame and two or more preceding frames from the sequence of frames of data. The two or more preceding frames may have been selected from the sequence of frames of data for inclusion in the packet based on a multi-stride packet-frame map specified by the packet map data structure. In some implementations, at least one of the two or more preceding frames of a respective packet is separated from the primary frame of the respective packet in the sequence of frames by a respective multiple of a first stride parameter and at least one of the two or more preceding frames of the respective packet is separated from the primary frame of the respective packet in the sequence of frames by a respective multiple of a second stride parameter that is different from the first stride parameter. For example, the packets may be received 1120 using a network interface (e.g., the network interface 120). In some implementations, the two or more preceding frames of each respective packet include a number of preceding frames equal to a sum of redundancy parameters for respective stride parameters, and the redundancy parameter for the second stride parameter is greater than one. The packets may be received 1120 via a network from one or more server devices (e.g., the server device 102).

The process 1100 includes storing 1130 the frames of the packets in a buffer (e.g., the ring buffer 302) with entries that each hold the primary frame and the two or more preceding frames of a packet. In some implementations, the two or more preceding frames of each respective packet include a number of preceding frames equal to a sum of redundancy parameters for respective stride parameters, including the first stride parameter and the second stride parameter. For example, the buffer may be sized to store frames from a number of packets equal to a largest stride parameter times the respective redundancy parameter for the largest stride parameter plus one. In some implementations, the received 1120 packets may be passed through a jitter buffer before the frames from the payload of the packets are stored 1130 in the buffer. For example, the process 1100 may include storing the packets in a jitter buffer as they are received 1120; and reading the packets from the jitter buffer before storing 1130 the frames of the packets in the buffer. In some implementations, frames in the sequence of frames of data are all a same size.

The process 1100 includes reading 1140 frames from the buffer (e.g., the ring buffer 302). For example, the process 700 of FIG. 7 may be implemented to read 1140 frames from the buffer. In some implementations, the frames of data from the sequence include audio data, and the process 1100 includes playing audio data of a frame responsive to reading the frame from the buffer. In some implementations, frames of data read 1140 from the buffer are reassembled in the sequence of frames of data in a reassembly buffer (e.g., the reassembly buffer 820 of FIG. 8). For example, the process 900 of FIG. 9 may be implemented to reassemble a sequence of frames of data to facilitating playing audio data.

Figure 12A:
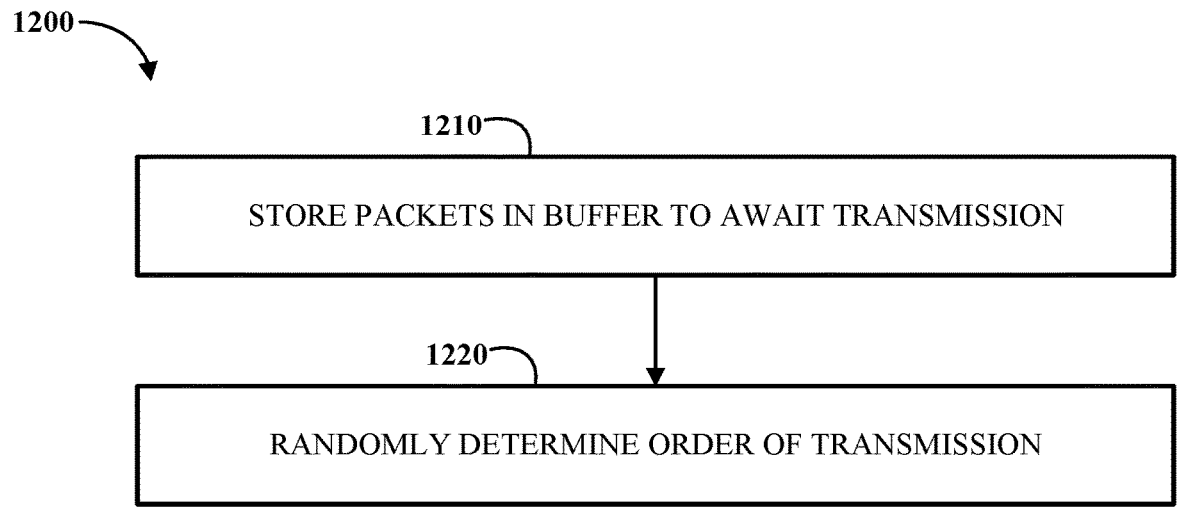
FIG. 12A is a flowchart illustrating an example of a process for randomizing a transmission order for packets bearing data partitioned into a sequence of frames of data.

FIG. 12A is a flowchart illustrating an example of a process 1200 for randomizing a transmission order for packets bearing data partitioned into a sequence of frames of data. The process 1200 includes storing 1210 packets, including a first packet and a second packet, in a buffer to await transmission in a randomly determined order. The packet payloads, including redundant frames of data, may be stored with or without various levels of communication protocol headers. Various sizes for the send-side buffer may be used, depending on the level of burst loss tolerance desired and the tolerance for end-to-end latency in an application. For example, a sender-side buffer may be sized to store data for a number of packets matching a number of packets stored by a ring buffer for the packet mapping scheme in a corresponding receiver device.

The process 1200 includes, randomly determining 1220 an order of transmission for the first packet and the second packet. In some implementations, randomly determining 1220 the order of transmission includes randomly generating an index to a buffer with entries that store data associated with respective packets, including the first packet and the second packet, to select a next packet for transmission. For example, the index to the buffer may be determined using a random number generator (RNG) of an operating system (e.g., the Linux kernel RNG). For example, the process 1200 of FIG. 12A may be implemented by the server device 102 of FIG. 1. For example, the process 1200 of FIG. 12A may be implemented by the computing device 400 of FIG. 4.

Figure 12B:
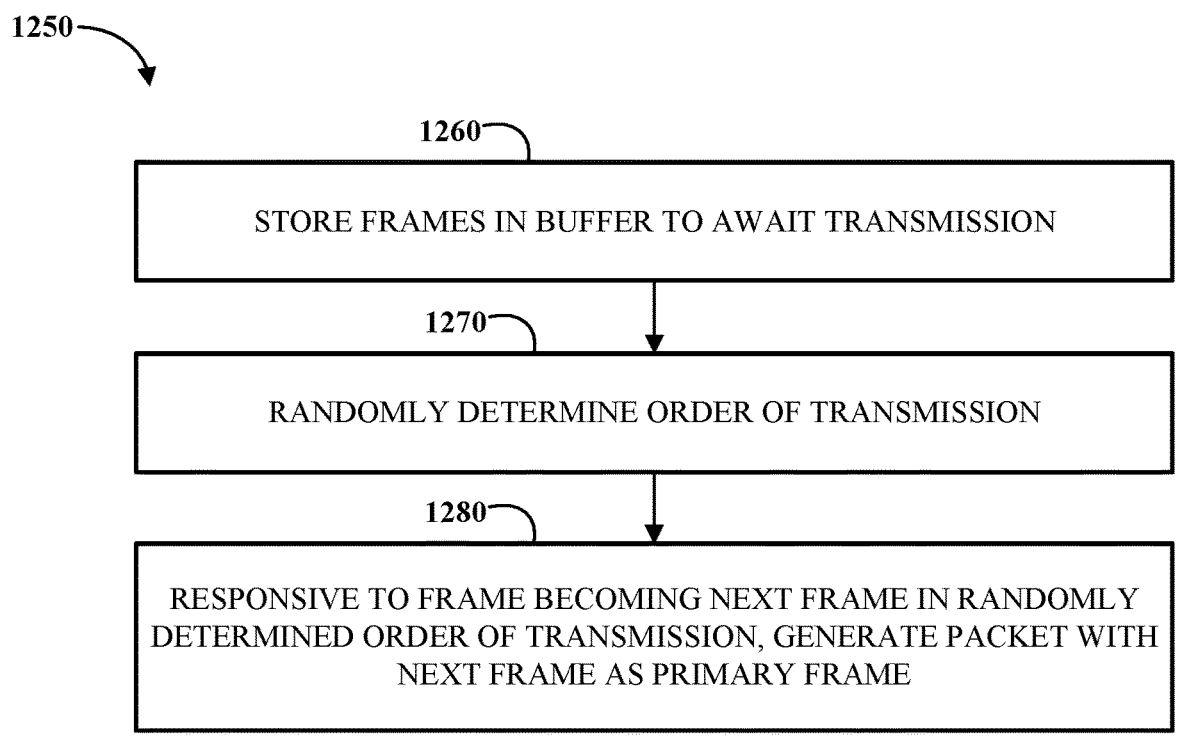
FIG. 12B is a flowchart illustrating an example of a process for randomizing a transmission order for packets bearing data partitioned into a sequence of frames of data.

FIG. 12B is a flowchart illustrating an example of a process 1250 for randomizing a transmission order for packets bearing data partitioned into a sequence of frames of data. In this example, packets are generated 1280 after the primary frame has been identified as next in a randomized order of transmission. The process 1250 may conserve memory by avoiding buffering redundant copies of frames of data that are present in the assembled packets under the packet mapping scheme. The process 1250 includes storing 1260 frames, including the primary frame of a first packet and the primary frame of a second packet, in a buffer to await transmission in the randomly determined order. Various sizes for the send-side buffer may be used, depending on the level of burst loss tolerance desired and the tolerance for end-to-end latency in an application. For example, a sender-side buffer may be sized to store data for a number of packets matching a number of packets stored by a ring buffer for the packet mapping scheme in a corresponding receiver device.

The process 1250 includes randomly determining 1270 an order of transmission for a first packet and a second packet. In some implementations, randomly determining 1270 the order of transmission includes randomly generating an index to a buffer with entries that store data associated with respective packets, including the first packet and the second packet, to select a next packet for transmission. For example, the index to the buffer may be determined using a random number generator (RNG) of an operating system (e.g., the Linux kernel RNG).

The process 1250 includes, responsive to the primary frame of a first packet becoming the next frame in the randomly determined order for transmission as a primary frame, generating the first packet. The first packet may be generated based on the frames of data related to its primary frame by the packet mapping scheme encoded by the packet map data structure. For example, the process 1250 of FIG. 12B may be implemented by the server device 102 of FIG. 1. For example, the process 1250 of FIG. 12B may be implemented by the computing device 400 of FIG. 4.

Figure 13:
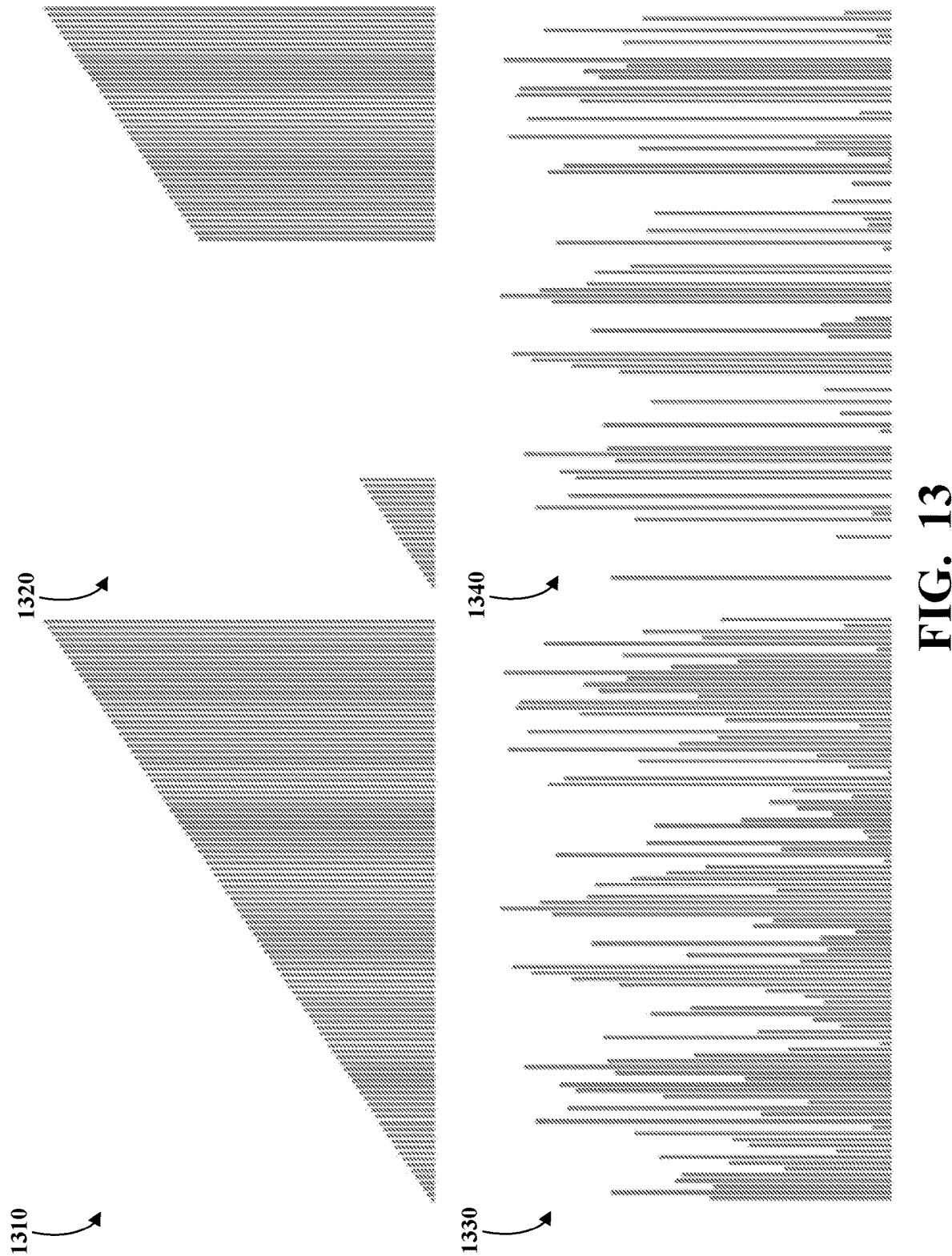
FIG. 13 shows four bar graphs illustrating burst packet loss with and without sender-side scrambling of an order of transmission.

FIG. 13 shows four bar graphs illustrating burst packet loss with and without sender-side scrambling of an order of transmission. In these bar graphs (1310, 1320, 1330, and 1340) the height of the line represents a live data frame sequence number. The bar graph 1310 illustrates data transmission without sender-side scrambling using a fixed order of transmission for the packets. The bar graph 1320 illustrates reception of the same packets subject to a burst loss pattern.

The bar graph 1330 illustrates data transmission with sender-side scrambling that randomly determines an order of transmission for the packets. The bar graph 1340 illustrates reception of the same packets transmitted in the randomized order subject to the same burst loss pattern shown in bar graph 1320. Note that the same burst loss pattern is now spread across the larger transmission.

Figure 14:
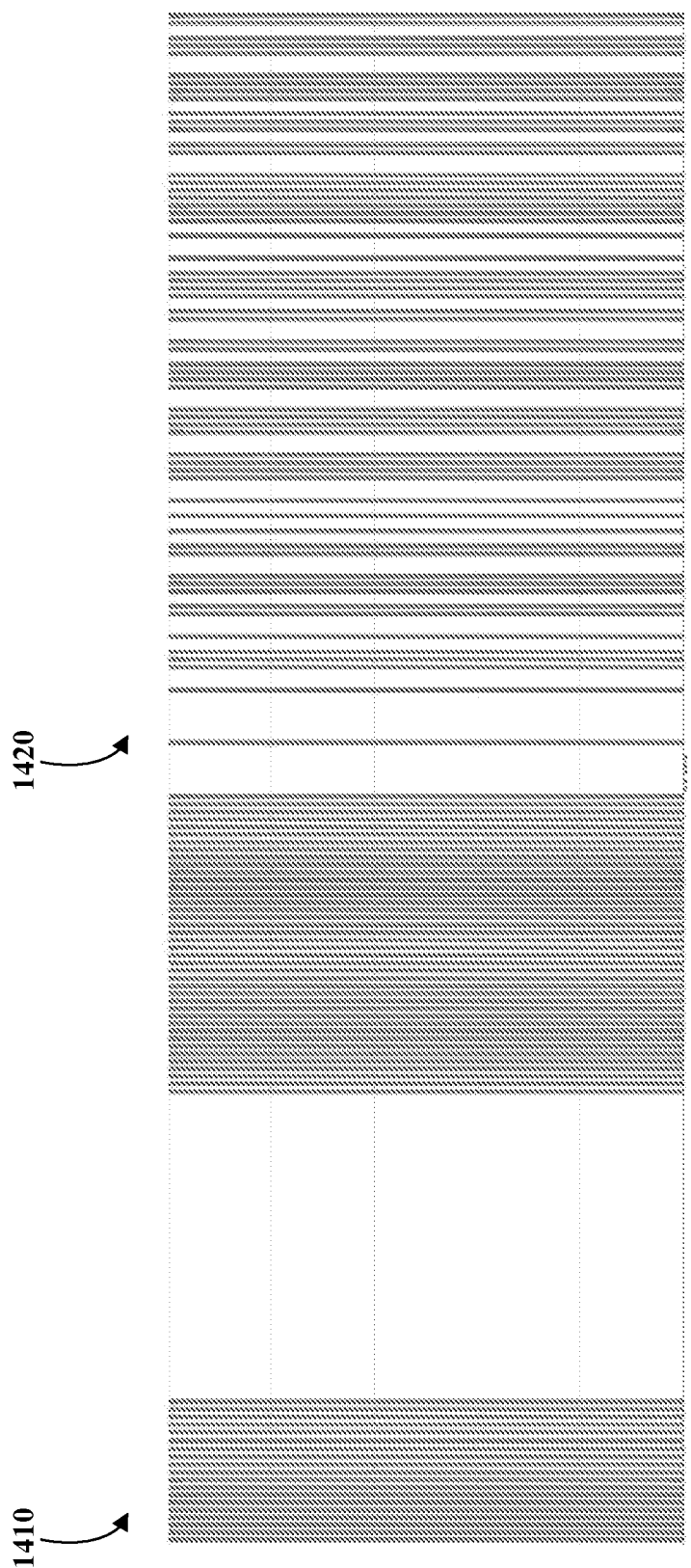
FIG. 14 shows two bar graphs illustrating burst packet loss with and without sender-side scrambling of an order of transmission.

FIG. 14 shows two bar graphs illustrating burst packet loss with and without sender-side scrambling of an order of transmission. FIG. 14 presents another view of burst loss amortized over a larger transmission window. In these bar graphs (1410 and 1420) the x axis corresponds to frame number of the primary frames and the y axis is binary. Bars that are present/non-zero height correspond to packets that have been successfully received. Bars that are absent/zero height correspond to packets that have been lost received. The bar graph 1410 illustrates reception of a sequence of packets that have been transmitted without scrambling. The bar graph 1420 illustrates reception of a sequence of packets that have been transmitted with scrambling. Scrambling, with a randomly determined order of transmission, may provide advantages, such as, by amortizing loss over a longer period of time, the actual consecutive loss amount becomes smaller which may both lends itself to packet map recovery as well as enable better data interpolation for lost frame data.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system for transmitting data partitioned into a sequence of frames of data, comprising:
   a network interface;
   a memory; and
   a processor, wherein the memory includes instructions executable by the processor to cause the system to:
   transmit, using the network interface, a first packet that includes a primary frame and two or more preceding frames from the sequence of frames of data, wherein at least one of the two or more preceding frames of the first packet is separated from the primary frame of the first packet in the sequence of frames by a respective multiple of a first stride parameter and at least one of the two or more preceding frames of the first packet is separated from the primary frame of the first packet in the sequence of frames by a respective multiple of a second stride parameter that is different from the first stride parameter;
   transmit, using the network interface, a second packet that includes a primary frame and two or more preceding frames from the sequence of frames of data, wherein at least one of the two or more preceding frames of the second packet is separated from the primary frame of the second packet in the sequence of frames by a respective multiple of the first stride parameter and at least one of the two or more preceding frames of the second packet is separated from the primary frame of the second packet in the sequence of frames by a respective multiple of the second stride parameter, and wherein the primary frame of the first packet is one of the two or more preceding frames of the second packet; and
   prior to transmitting the first packet and the second packet, randomly determine an order of transmission for the first packet and the second packet.

2. The system of claim 1, wherein the memory includes instructions executable by the processor to cause the system to:
   store packets, including the first packet and the second packet, in a buffer to await transmission in the randomly determined order.

3. The system of claim 1, wherein the memory includes instructions executable by the processor to cause the system to:
   store frames, including the primary frame of the first packet and the primary frame of the second packet, in a buffer to await transmission in the randomly determined order; and
   responsive to the primary frame of the first packet becoming the next frame in the randomly determined order for transmission as a primary frame, generate the first packet.

4. The system of claim 1, wherein the first stride parameter is less than three and the second stride parameter is greater than four.

5. The system of claim 1, wherein at least one of the two or more preceding frames of the first packet is separated from the primary frame of the first packet in the sequence of frames by a respective multiple of a third stride parameter that is different from the first stride parameter and the second stride parameter.

6. The system of claim 1, wherein the memory includes instructions executable by the processor to cause the system to:
transmit, using the network interface, all frames between the primary frame of the first packet and the primary frame of the second packet in the sequence of frames of data as primary frames of respective packets that each include two or more preceding frames from the sequence of frames of data separated in the sequence of frames by multiples of the first stride parameter and the second stride parameter.

7. The system of claim 1, wherein the memory includes instructions executable by the processor to cause the system to:
transmit, using the network interface, a packet map data structure that indicates the first stride parameter and the second stride parameter and indicates counts of redundant preceding frames for each stride parameter to be transmitted in each packet of a set of packets including the first packet and the second packet.

8. A method for transmitting data partitioned into a sequence of frames of data, comprising:
transmitting, using a network interface, a first packet that includes a primary frame and two or more preceding frames from the sequence of frames of data, wherein at least one of the two or more preceding frames of the first packet is separated from the primary frame of the first packet in the sequence of frames by a respective multiple of a first stride parameter and at least one of the two or more preceding frames of the first packet is separated from the primary frame of the first packet in the sequence of frames by a respective multiple of a second stride parameter that is different from the first stride parameter;
transmitting, using the network interface, a second packet that includes a primary frame and two or more preceding frames from the sequence of frames of data, wherein at least one of the two or more preceding frames of the second packet is separated from the primary frame of the second packet in the sequence of frames by a respective multiple of the first stride parameter and at least one of the two or more preceding frames of the second packet is separated from the primary frame of the second packet in the sequence of frames by a respective multiple of the second stride parameter, and wherein the primary frame of the first packet is one of the two or more preceding frames of the second packet; and
prior to transmitting the first packet and the second packet, randomly determining an order of transmission for the first packet and the second packet.

9. The method of claim 8, wherein randomly determining the order of transmission comprises:
randomly generating an index to a buffer with entries that store data associated with respective packets, including the first packet and the second packet, to select a next packet for transmission.

10. The method of claim 8, comprising:
storing packets, including the first packet and the second packet, in a buffer to await transmission in the randomly determined order.

11. The method of claim 8, comprising:
storing frames, including the primary frame of the first packet and the primary frame of the second packet, in a buffer to await transmission in the randomly determined order; and
responsive to the primary frame of the first packet becoming the next frame in the randomly determined order for transmission as a primary frame, generating the first packet.

12. The method of claim 8, wherein the first stride parameter is less than three and the second stride parameter is greater than four.

13. The method of claim 8, comprising:
transmitting, using the network interface, all frames between the primary frame of the first packet and the primary frame of the second packet in the sequence of frames of data as primary frames of respective packets that each include two or more preceding frames from the sequence of frames of data separated in the sequence of frames by multiples of the first stride parameter and the second stride parameter.

14. The method of claim 8, comprising:
transmitting, using the network interface, a packet map data structure that indicates the first stride parameter and the second stride parameter and indicates counts of redundant preceding frames for each stride parameter to be transmitted in each packet of a set of packets including the first packet and the second packet.

15. A system for transmitting data partitioned into a sequence of frames of data, comprising:
a network interface;
a memory; and
a processor, wherein the memory includes instructions executable by the processor to cause the system to:
transmit, using the network interface, a first packet that includes a primary frame and one or more preceding frames from the sequence of frames of data, wherein the one or more preceding frames of the first packet are separated from the primary frame of the first packet in the sequence of frames by respective multiples of a stride parameter;
transmit, using the network interface, a second packet that includes a primary frame and one or more preceding frames from the sequence of frames of data, wherein the one or more preceding frames of the second packet are separated from the primary frame of the second packet in the sequence of frames by respective multiples of the stride parameter, and wherein the primary frame of the first packet is one of the one or more preceding frames of the second packet; and
prior to transmitting the first packet and the second packet, randomly determine an order of transmission for the first packet and the second packet.

16. The system of claim 15, wherein the memory includes instructions executable by the processor to cause the system to:
store packets, including the first packet and the second packet, in a buffer to await transmission in the randomly determined order.

17. The system of claim 15, wherein the memory includes instructions executable by the processor to cause the system to:
store frames, including the primary frame of the first packet and the primary frame of the second packet, in a buffer to await transmission in the randomly determined order; and responsive to the primary frame of the first packet becoming the next frame in the randomly determined order for transmission as a primary frame, generate the first packet.

18. The system of claim 15, wherein the stride parameter is greater than four.

19. The system of claim 15, wherein the memory includes instructions executable by the processor to cause the system to:

transmit, using the network interface, all frames between the primary frame of the first packet and the primary frame of the second packet in the sequence of frames of data as primary frames of respective packets that each include one or more preceding frames from the sequence of frames of data separated in the sequence of frames by multiples of the stride parameter.

20. The system of claim 15, wherein the memory includes instructions executable by the processor to cause the system to:

transmit, using the network interface, a packet map data structure that indicates the stride parameter and indicates a count of redundant preceding frames to be transmitted in each packet of a set of packets including the first packet and the second packet.

* * * * *